US009131243B2

(12) United States Patent
Yamori

(10) Patent No.: US 9,131,243 B2
(45) Date of Patent: Sep. 8, 2015

(54) VIDEO DECODING METHOD, VIDEO CODING METHOD, VIDEO DECODING DEVICE, AND COMPUTER-READABLE RECORDING MEDIUM STORING VIDEO DECODING PROGRAM

(75) Inventor: Akihiro Yamori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 318 days.

(21) Appl. No.: 13/343,367

(22) Filed: Jan. 4, 2012

(65) Prior Publication Data

US 2012/0224634 A1 Sep. 6, 2012

(30) Foreign Application Priority Data

Mar. 1, 2011 (JP) ................................. 2011-043673

(51) Int. Cl.
*H04N 7/28* (2006.01)
*H04N 19/44* (2014.01)
*H04N 19/597* (2014.01)
*H04N 19/513* (2014.01)

(52) U.S. Cl.
CPC ............. *H04N 19/44* (2014.11); *H04N 19/513* (2014.11); *H04N 19/597* (2014.11)

(58) Field of Classification Search
CPC ... H04N 7/26; H04N 19/00; H04N 19/00769; H04N 13/00; H04N 13/0048
USPC .................................................... 375/240.16
See application file for complete search history.

(56) References Cited

U.S. PATENT DOCUMENTS

| | | | | |
|---|---|---|---|---|
| 6,999,513 | B2 * | 2/2006 | Sohn et al. | 375/240.16 |
| 8,488,677 | B2 * | 7/2013 | Jeon et al. | 375/240.16 |
| 2005/0213828 | A1 | 9/2005 | Thoreau et al. | |
| 2006/0029137 | A1 * | 2/2006 | Lee et al. | 375/240.12 |
| 2007/0014358 | A1 * | 1/2007 | Tourapis et al. | 375/240.15 |
| 2008/0170618 | A1 * | 7/2008 | Choi et al. | 375/240.16 |
| 2009/0168874 | A1 * | 7/2009 | Su et al. | 375/240.12 |
| 2009/0190662 | A1 * | 7/2009 | Park et al. | 375/240.16 |
| 2009/0208102 | A1 | 8/2009 | Watanabe | |

(Continued)

FOREIGN PATENT DOCUMENTS

| | | |
|---|---|---|
| JP | 2005-110289 | 4/2005 |
| JP | 2009-509454 | 3/2009 |

(Continued)

OTHER PUBLICATIONS

Japanese Office Action issued Sep. 24, 2014 in corresponding Japanese Patent Application No. 2011-043671.

*Primary Examiner* — Jay Patel
*Assistant Examiner* — Francis G Geroleo
(74) *Attorney, Agent, or Firm* — Staas & Halsey LLP

(57) ABSTRACT

A video decoding method of decoding coded data of a multi-view video, the method includes, determining, in a case where a decoding target block is coded in a temporal direct-mode, whether or not a block at a same position of a picture that becomes a reference of the temporal direct-mode with respect to the decoding target block has a disparity vector referring to a block of another view point. The method also includes calculating, in a case where the block at the same position has the disparity vector, a motion vector of the decoding target block by using a motion vector belonging to the block of another view point to which the disparity vector refers; and decoding the decoding target block by using the calculated motion vector.

8 Claims, 19 Drawing Sheets

(56) References Cited

U.S. PATENT DOCUMENTS

| | | | |
|---|---|---|---|
| 2009/0290643 A1* | 11/2009 | Yang | 375/240.16 |
| 2009/0304068 A1* | 12/2009 | Pandit et al. | 375/240.01 |
| 2010/0266042 A1* | 10/2010 | Koo et al. | 375/240.16 |
| 2011/0211640 A1* | 9/2011 | Kim et al. | 375/240.16 |
| 2012/0189060 A1* | 7/2012 | Lee et al. | 375/240.16 |
| 2013/0114726 A1* | 5/2013 | Maeda et al. | 375/240.16 |
| 2013/0229485 A1* | 9/2013 | Rusanovskyy et al. | 348/43 |
| 2013/0243081 A1* | 9/2013 | Chen et al. | 375/240.02 |
| 2013/0342644 A1* | 12/2013 | Rusanovskyy et al. | 348/43 |

FOREIGN PATENT DOCUMENTS

| | | |
|---|---|---|
| JP | 2009-522986 | 6/2009 |
| JP | 2009-187397 | 8/2009 |
| JP | 2009-543508 | 12/2009 |
| WO | WO 2007/035054 | 3/2007 |

* cited by examiner

FIG. 18

| Slice_header( ){ | C | DESCRIPTOR |
|---|---|---|
|  |  |  |
| if( redundant_pic_cnt_present_flag ) |  |  |
|   redundant_pic_cnt | 2 | Ue(v) |
| if( slice_type == B ) |  |  |
|   direct_spatial_mv_pred_flag | 2 | U(1) |
|  |  |  |
| if( num_slice_groups_minus1 > 0 &&<br>    slice_group_map_type >= 3 &&<br>slice_group_map_type <= 5) |  |  |
|   slice_group_change_cycle | 2 | U(v) |
| } |  |  |

VIDEO DECODING METHOD, VIDEO CODING METHOD, VIDEO DECODING DEVICE, AND COMPUTER-READABLE RECORDING MEDIUM STORING VIDEO DECODING PROGRAM

CROSS-REFERENCE TO RELATED APPLICATION

This application is based upon and claims the benefit of priority of the prior Japanese Patent Application No. 2011-043673, filed on Mar. 1, 2011, the entire contents of which are incorporated herein by reference.

FIELD

Embodiments disclosed herein relate to a video decoding method of dealing with a multi-view video, a video coding method, a video decoding device, and a computer-readable recording medium storing video decoding program.

BACKGROUND

In a coding system H.264 and subsequent next-generation coding systems, five modes are proposed as prediction modes in a bi-directive picture. These modes include an intra-frame coding (Intra), a forward prediction coding (Forward Prediction), a backward prediction coding (Backward Prediction), a bi-directive prediction coding (Bi-directive Prediction), and a direct-mode (Direct Mode).

This direct-mode is a coding mode for paying attention to a succession of videos and deciding a motion vector of a current MB from motion vectors of temporally and spatially adjacent MBs (macroblocks). The direct-mode contributes to an improvement of coding efficiency from a standpoint of enhancing a spatio-temporal correlation of the motion and also avoiding a transmission of information related to the motion vectors.

On the other hand, the bi-directive prediction in the coding of H.264 is realized from predictions in a List0 direction and a List1 direction. In general, List0 is a forward direction, and List1 is a backward direction. A reason why these directions are referred to as List0 and List1 instead of forward direction and backward direction is that a forward/forward bi-directive prediction and a backward/backward bi-directive prediction may be carried out in addition to the forward/backward bi-directive prediction.

Also, since a plurality of references may be carried out in respective reference directions, a picture unit is assigned with a number of a reference index Ref_idx. According to the direct-mode, by using a motion vector indicated by a same position MB of a reference picture having a smallest Ref_idx of List1 direction (future, in general) as a reference, two motion vectors are obtained. These two motion vectors are basically forward and backward motion vectors.

It should be noted that in the following description, the motion vector functioning as the reference is referred to as reference vector, and the obtained motion vector is referred to as direct vector.

Also, for the direct-mode, two modes including a temporal direct-mode and a spatial direct-mode exist.

FIG. 1 is an explanatory diagram for describing the temporal direct-mode. In the example illustrated in FIG. 1, a picture of a coding target is referred to as CurrPic (Current Picture), and this CurrPic is set as B picture where the bi-directive prediction is carried out. Also, a picture of Ref_idex=0 in the List1 direction of the CurrPic which is the already coded picture is referred to as colPic (co-located Picture).

In the colPic, a motion vector used for coding an MB located at a same position as the MB of the coding target is referred to as mvCol (reference vector). A picture referred to by this mvCol is referred to as refPicCol. A time distance between the colPic and the refPicCol is referred to as td, and a time distance between the currPic and the refPicCol is referred to as tb.

Herein, the motion vectors from the CurrPic to the refPicCol and ColPic are subjected to scaling of a time allocation of the mvCol, and the obtained temporal direct vectors mvL0 and mvL1 are used as prediction vectors of the relevant block. The time allocation is calculated by a difference of POC (Picture Order Count: a display order of Picture).

The temporal direct vector is calculated by the following expression. mvL0=((tb/td)×Vx, (tb/td)×Vy):tb/td-fold mvL1 of mvCol=a difference between mvL0−mvCol:mvL0 and mvCol. Herein, mvCol=(Vx, Vy).

To increase the prediction efficiency of the motion vector in this temporal direct-mode, a technology of setting the motion vectors in the temporal direct-mode on a straight line is proposed.

It should be noted that in general, a way of preparing the motion vectors used in the direct-mode is decided by a value of direct_8×8_inference_flag of SPS (Sequence_parameter_set). For example, in the case of direct_8×8_inference_flag=1, the motion vectors used in the direct-mode are prepared in the unit of 8×8, and in the case of direct_8×8_inference_flag=0, the motion vectors used in the direct-mode are prepared in the unit of 4×4.

FIG. 2 is an explanatory diagram for describing the spatial direct-mode. In the spatial direct-mode, the mvCol is used in the same manner as the temporal direct-mode, but as illustrated in FIG. 2, the mvCol is used only for a static dynamic determination. In the spatial direct-mode, in a case where it is determined as static, 0 vector is set, and in a case where it is determined as dynamic, a prediction vector is generated from a motion vector of a motion vector in a peripheral block in the coding target picture (in the space).

In the example illustrated in FIG. 2, when it is determined as dynamic, an intermediate value of the motion vectors in the peripheral MB (top, upper left, and left) of the coding target is set as a spatial direct vector. For example, the spatial direct vector is set as fmvU and bmvUR. The reference picture is a smallest value of the peripheral MB.

In recent years, as a Multi-view Video Coding (MVC), a coding dealing with a multi-view is standardized as an extension of H.264. A stereoscopic view-corresponding coding is the case of two eyes of the MVC. In general, a left-view image of two eyes is referred to as Base-View, and a right-view image is referred to as non-Base-view. The Base-View is an image in which the inter prediction is closed in a view point of its own. According to the MVC, an inter-view prediction that is a prediction between different view points is added in addition to the prediction coding in a time direction (within the same view point) in related art. The inter-view prediction is designed to carry out an inter-view prediction at a same time (POC).

According to Japanese Laid-open Patent Publication No. 2005-110289 and Japanese National Publication of International Patent Application No. 2009-509454, in the technology of the MVC, a technology is disclosed in which when a disparity vector is predicted, disparity vectors with respect to the predetermined number of previously coded macro blocks are predicted, and the disparity vector is calculated by utilizing the predicted disparity vectors.

SUMMARY

In accordance with an aspect of the embodiments, a video decoding method of decoding coded data of a multi-view video, the method includes, determining, in a case where a decoding target block is coded in a temporal direct-mode, whether or not a block at a same position of a picture that becomes a reference of the temporal direct-mode with respect to the decoding target block has a disparity vector referring to a block of another view point; calculating, in a case where the block at the same position has the disparity vector, a motion vector of the decoding target block by using a motion vector belonging to the block of another view point to which the disparity vector refers, and decoding the decoding target block by using the calculated motion vector.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 18 illustrates an example of Slice Header;

DESCRIPTION OF EMBODIMENTS

Hereinafter, embodiments will be described with reference to the attached drawings.

Figure 3:
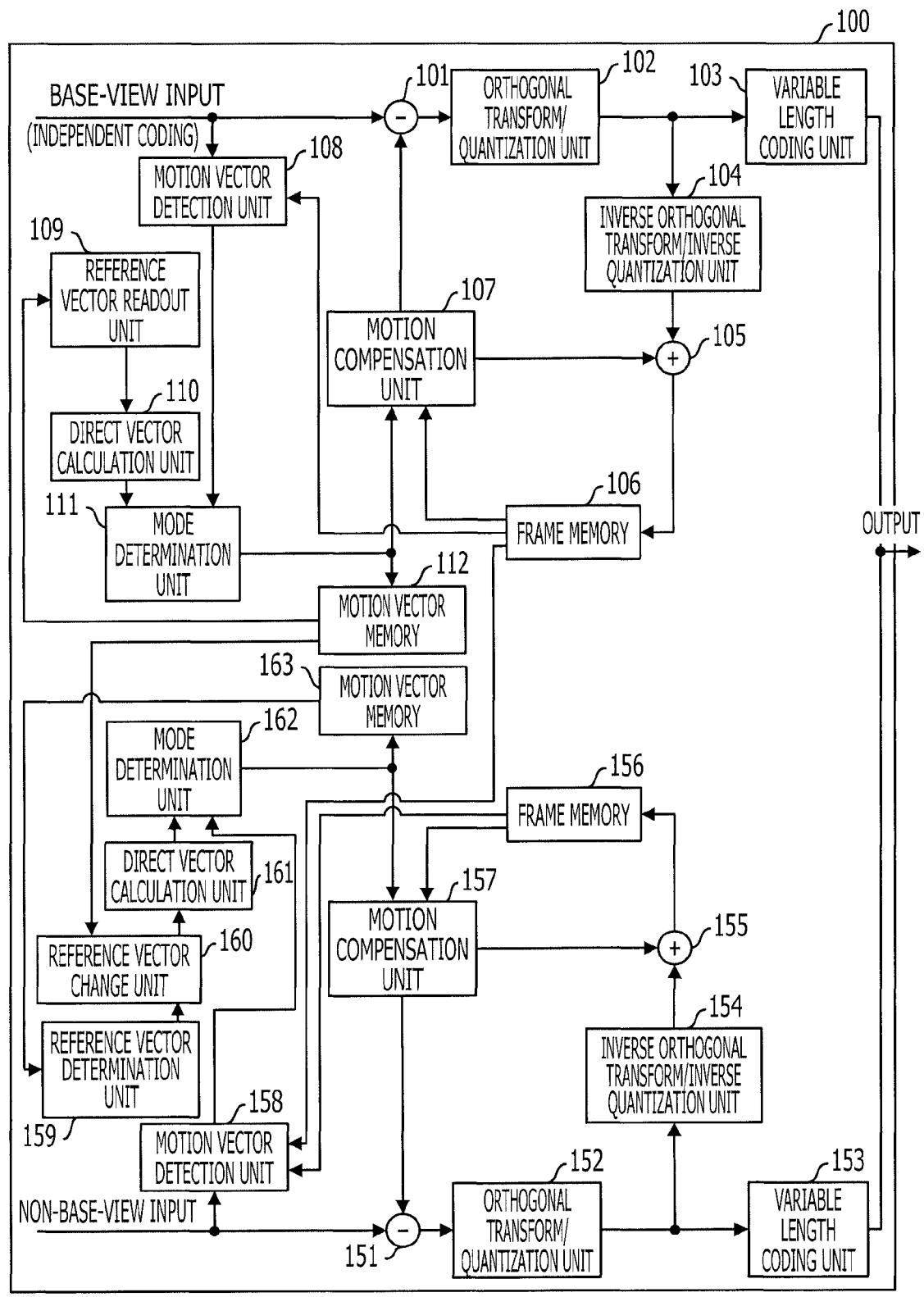
FIG. 3 is a block diagram illustrating an example of a configuration of a video coding device according to a first embodiment.

A first embodiment will be described. FIG. 3 is a block diagram illustrating an example of a configuration of a video coding device 100 according to the first embodiment. To code the video of the Base-View, the video coding device 100 illustrated in FIG. 3 is provided with a prediction error generation unit 101, an orthogonal transform/quantization unit 102, a variable length coding unit 103, an inverse orthogonal transform/inverse quantization 104, a decoded image generation unit 105, and a frame memory 106. Also, the video coding device 100 is provided with a motion compensation unit 107, a motion vector detection unit 108, a reference vector readout unit 109, a direct vector calculation unit 110, a mode determination unit 111, and a motion vector memory 112.

Also, to code the video of the non-Base-View, the video coding device 100 is provided with a prediction error generation unit 151, an orthogonal transform/quantization unit 152, a variable length coding unit 153, an inverse orthogonal transform/inverse quantization 154, a decoded image generation unit 155, and a frame memory 156. Also, the video coding device 100 is provided with a motion compensation unit 157, a motion vector detection unit 158, a reference vector determination unit 159, a reference vector change unit 160, a direct vector calculation unit 161, a mode determination unit 162, and a motion vector memory 163. Outlines of the respective units will be described below.

First, a processing of coding the video on the Base-View side will be described. The prediction error generation unit 101 obtains macro block data (hereinafter, which will be also referred to as MB data) that is obtained by dividing a coding target image of the input video data into blocks (MBs) of 16×16 pixels. The prediction error generation unit 101 generates prediction error data on the basis of the relevant MB data and the MB data of the predicted image that is output from the motion compensation unit 107. The prediction error generation unit 101 outputs the generated prediction error data to the orthogonal transform/quantization unit 102.

The orthogonal transform/quantization unit 102 subjects the input prediction error data to an orthogonal transform processing in the unit of 8×8 or in the unit of 4×4. The orthogonal transform processing includes DCT (Discrete Cosine Transform) transform, Hadamard transform, and the like. The orthogonal transform/quantization unit 102 obtains the data separated into frequency components in the horizontal and vertical directions through the orthogonal transform processing.

This is because on the basis of the spatial correlation of the image, the data gathers in the low frequency components by the transform into the frequency components and it is possible to compress the information amount.

The orthogonal transform/quantization unit 102 reduces the coding amount of the data by quantizing the orthogonally transformed data and outputs this quantized value to the variable length coding unit 103 and the inverse orthogonal transform/inverse quantization 104.

The variable length coding unit 103 subjects the data output from the orthogonal transform/quantization unit 102 to the variable length coding to be output. The variable length coding refers to a system of allocating a variable length code in accordance with a frequency of appearance of the symbol.

The variable length coding unit 103 basically allocates, for example, a shorter code to a combination having a higher coefficient of the frequency of appearance and a longer code to a combination having a lower coefficient of the frequency of appearance. According to this configuration, the code length is desired to be shortened as a whole. According to H.264, variable length codings of systems called CAVLC (Context-Adaptive Variable Length Coding) and CABAC (Context-Adaptive Binary Arithmetic Coding) may be selected.

The inverse orthogonal transform/inverse quantization 104 subjects the data output from the orthogonal transform/quantization unit 102 to the inverse quantization and then the inverse orthogonal transform. The inverse orthogonal transform/inverse quantization 104 performs the inverse orthogonal transform to carry out the transform from the frequency components to pixel components and outputs the data after the transform to the decoded image generation unit 105. Since a decoding processing is carried out by the inverse orthogonal transform/inverse quantization 104, it is possible to obtain a signal at the comparable level as a prediction error signal before the coding.

The decoded image generation unit 105 adds the MB data of the image where the motion compensation is carried out by the motion compensation unit 107 with the prediction error data subjected to the decoding processing by the inverse orthogonal transform/inverse quantization 104. According to this configuration, the processing image equivalent to the decoding side may also be generated on the coding side.

The image generated on the coding side is referred to as local decoded image, and by generating the same processing image as the decoding side on the coding side, it is possible to carry out a differential coding on the next and subsequent pictures. The decoded image generation unit 105 outputs the MB data on the local decoded image generated through the addition to the frame memory 106. It should be noted that a deblock filter may be applied on the MB data on the local decoded image. The local decoded image may become a reference image.

The frame memory 106 stores the input MB data as new reference image data. The reference image is read out by the motion compensation unit 107, the motion vector detection unit 108, and the motion vector detection unit 158.

The motion compensation unit 107 subjects the data on the reference image obtained from the frame memory 106 to the motion compensation by the motion vector provided from the motion vector memory 112. According to this configuration, the MB data as the reference image subjected to the motion compensation is generated.

The motion vector detection unit 108 uses the MB data in the coding target picture and the MB data on the coded reference image obtained from the frame memory 106 to perform a motion search and obtains an appropriate motion vector.

The motion vector is a value indicating a spatial shift in the unit of block obtained by using a block matching technology for search for a position most analogous to the coding target image from the reference image in the unit of block.

The motion search generally adds, for example, not only the magnitude of the differential absolute sum of the pixels but also an evaluation value of the motion vector. The coding of the motion vector codes the differential vector with respect to the motion vector of the periphery MB instead of the component itself. Therefore, the motion vector detection unit 108 obtains the differential vector and outputs an evaluation value equivalent to the motion vector coding length on the basis of the size of the relevant component.

When the evaluation value of the motion search is set as cost, the differential absolute value is set as SAD_cost (Sum Absolute Difference), and the evaluation value equivalent to the motion vector coding amount is set as MV_cost (Motion Vector), the motion vector detection unit 108 detects the position of the motion vector where cost is smallest through the following expression. cost=SAD_cost+MV_cost The motion vector detection unit 108 outputs the detected motion vector to the mode determination unit 111.

In a case where the MB of the coding target is the bi-directive prediction, the reference vector readout unit 109 reads out the motion vector of the block at the same position of the colPic (reference vector) from the motion vector memory 112. The reference vector readout unit 109 outputs the read out reference vector to the direct vector calculation unit 110.

Figure 1:
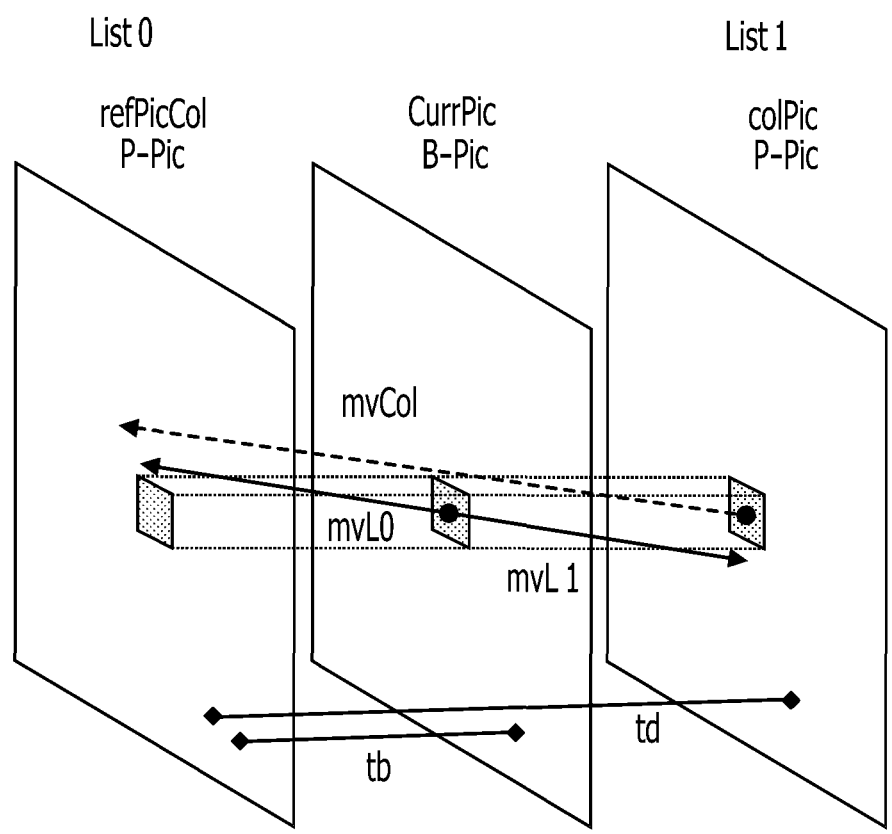
FIG. 1 is an explanatory diagram for describing a temporal direct-mode.
Figure 2:
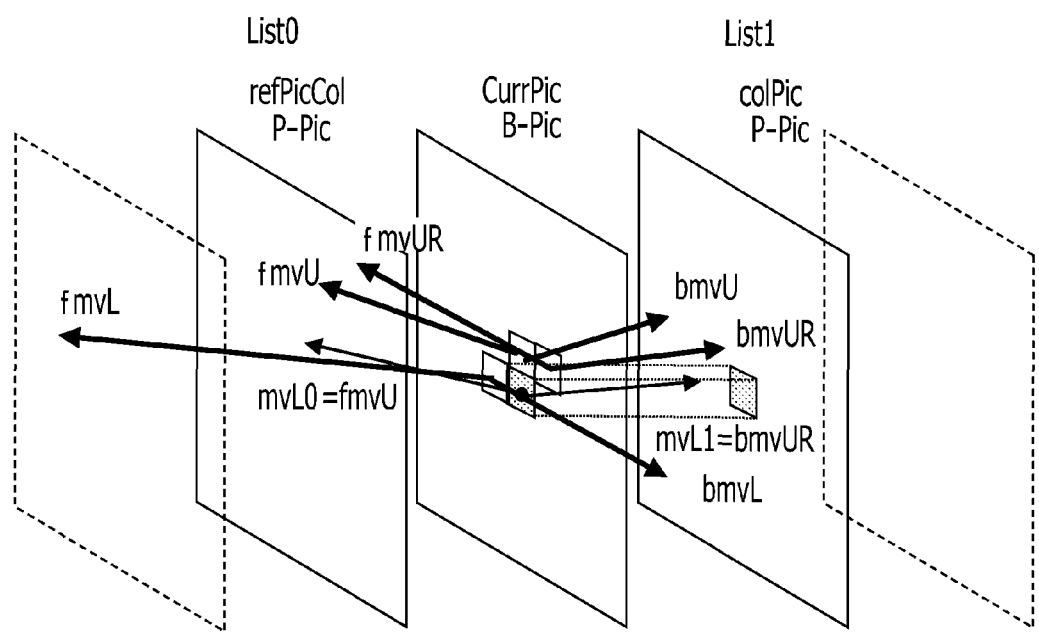
FIG. 2 is an explanatory diagram for describing a spatial direct-mode.

The direct vector calculation unit 110 subjects the obtained reference vector to scaling at the temporal allocation and calculates the motion vector of the MB of the coding target (direct vector) (see FIG. 1). The direct vector calculation unit 110 outputs the calculated motion vector to the mode determination unit 111.

The mode determination unit 111 selects the coding mode where the coding cost is the lowest among the above-mentioned five coding (prediction) modes. The mode determination unit 111 selects, for example, an optimal prediction mode for a case in which the motion prediction using the direct vector is carried out and a case in which the normal prediction of the motion vector is carried out (Forward, Backward, Bi-directive, and Intra).

To be more specific, the mode determination unit 111 calculates the evaluation value for each prediction mode as follows. cost_direct=SAD(*org, *ref); cost_forward=SAD(*org, *ref)+MV_COST(*mv, *prevmv); cost_backward=SAD(*org, *ref)+MV_COST(*mv, *prevmv); cost_bi-direction=SAD(*org, *ref)+MV_COST(*mv, *prevmv); cost_intra=ACT(*org);

Herein, with regard to SAD( ) the mode determination unit 111 obtains a pixel differential absolute sum in the MB, and in this case, obtains a differential absolute sum of 16×16 pixels of an original image MB(*org) and a reference image MB(*ref) through the following expression. SAD( )=Σ|*org−*ref|

According to the H.264 coding or the like, the MB may be divided into a plurality of sub blocks in 1 MB. In view of the above, in a case where the MB is divided, for example, into four sub blocks of 8×8, four pieces of assemblage of the differential absolute sum of 8×8=64 pixels becomes an SAD evaluation value. It should be noted that for the sub blocks, various sizes such as 8×16, 16×8, 4×8, 8×4, and 4×4 may exist in addition to 16×16 and 8×8.

In the case of IntraMB, since the original image itself is coded instead of the differential image, another evaluation value called activity is used. In the case of the Intra coding, the original image MB itself is subjected to the orthogonal transform. Therefore, ACT( ) may be obtained on the basis of a divergence from an MB average value (=AveMB) of the respective pixels of the MB or the like through the following expression. ACT( )=Σ|*org−AveMB|

MV_COST is an evaluation value proportional to the coding amount of the motion vector. With regard to the motion vector (*mv), since the differential vector with respect to the prediction vector (*prevmv) based on the periphery MB is coded instead of the component itself, the evaluation is decided by the magnitude of the absolute value.

In general, a weight constant λ is used, and an influence degree on the entire cost evaluation value of MV_COST is changed. MV_COST=λ*(Table[mv−*prevmv]) where Table[ ] is a table for transforming the magnitude of the vector difference to the equivalence of the coding amount.

It should be noted that various methods are proposed as a method of actually carrying out a weighting. For example, hereinafter, two examples are described. cost_direct+=W (W: weight constant). Through the above-mentioned expression, a fixed value may be added to increase the evaluation value. cost_direct*=α (α: weighting coefficient). Through the above-mentioned expression, the evaluation value may be multiplied by the constant.

The mode determination unit 111 obtains a smallest evaluation cost, for example, through the following expression and decides MB_Type corresponding to the smallest evaluation cost as MB_Type used for the coding. min_cost=min(cost_direct, cost_forward, cost_backward, cost_bidirection, cost_intra);

Since MV_COST does not exist, the direct-mode tends to be selected in a case where the prediction is correct and the SAD evaluation value is equal in all the modes and is also low, or the like. The mode determination unit 111 stores the motion vector used in the selected coding mode in the motion vector memory 112 and notifies the motion compensation unit 107 of the selected coding mode.

The motion vector memory 112 stores the motion vector used for the coding. The motion vector stored in the motion vector memory 112 is read out by the motion compensation unit 107 or read out by the reference vector change unit 160. According to this configuration, the video on the Base-View side is coded independently in a predetermined coding system.

Next, a case of coding the video on the non-Base-View side will be described. Similarly as in the Base-View side, the prediction error generation unit 151 generates prediction error data on the basis of the MB data of the coding target and the MB data of the predicted image that is output from the motion compensation unit 107. The prediction error generation unit 151 outputs the generated prediction error data to the orthogonal transform/quantization unit 152.

The orthogonal transform/quantization unit 152 subjects the input prediction error data to the orthogonal transform processing. The orthogonal transform/quantization unit 152 obtains the data separated into frequency components in the horizontal and vertical directions through the orthogonal transform processing.

The orthogonal transform/quantization unit 152 reduces the coding amount of the data by quantizing the orthogonally transformed data and outputs this quantized data to the variable length coding unit 153 and the inverse orthogonal transform/inverse quantization 154.

The variable length coding unit 153 subjects the data output from the orthogonal transform/quantization unit 152 to the variable length coding to be output. The variable length coding refers to a system of allocating a variable length code in accordance with a frequency of appearance of the symbol.

The inverse orthogonal transform/inverse quantization 154 subjects the data output from the orthogonal transform/quantization unit 152 to the inverse quantization and then the inverse orthogonal transform. The inverse orthogonal transform/inverse quantization 154 outputs the data subjected to the inverse orthogonal transform to the decoded image generation unit 155. Since the decoding processing is carried out by the inverse orthogonal transform/inverse quantization 154, it is possible to obtain the signal at the comparable level as the prediction error signal before the coding.

The decoded image generation unit 155 adds the MB data of the image where the motion compensation is carried out by the motion compensation unit 157 with the prediction error data subjected to the decoding processing by the inverse orthogonal transform/inverse quantization 154. The decoded image generation unit 155 outputs the MB data on the decoded image generated through the addition to the frame memory 156. It should be noted that the deblock filter may be applied on the MB data on the decoded image.

The frame memory 156 stores the input MB data as the data on the new reference image to be output to the motion compensation unit 157 and the motion vector detection unit 158.

The motion compensation unit 157 subjects the data on the reference image obtained from the frame memory 156 to the motion compensation by the motion vector provided from the motion vector memory 163. According to this configuration, the MB data as the reference image subjected to the motion compensation is generated.

The motion vector detection unit 158 uses the MB data in the coding target picture and the MB data on the coded reference image obtained from the frame memory 156 and obtains the motion vector.

It should be noted that when the reference image of another view point may be used, the motion vector detection unit 158 performs the block matching on the block of the reference image obtained from the frame memory 106.

The motion vector detection unit 158 outputs the motion vector detected with respect to the reference image of the same view point and/the reference image of another view point to the mode determination unit 162.

In a case where the MB of the coding target is the bi-directive prediction, the reference vector determination unit 159 reads out the motion vector of the block at the same position of the colPic (reference vector) from the motion vector memory 163. At this time, the reference vector determination unit 159 determines whether or not the block at the same position has the disparity vector for referring to (pointing to) the block of the picture of another view point. The disparity vector is a vector for referring to the block of another view point.

In a case where the block at the same position has the motion vector for referring to the same view point block, the reference vector determination unit 159 outputs the motion vector of the block at the same position to the mode determination unit 162. On the other hand, in a case where the block at the same position has the disparity vector for referring to the block of another view point, the reference vector determination unit 159 outputs the information indicating the block of another view point to the reference vector change unit 160.

The reference vector change unit 160 obtains the motion vector belonging to the block of another view point from the motion vector memory 112 with respect to the block of another view point obtained from the reference vector determination unit 159. The reference vector change unit 160 sets the obtained motion vector as the reference vector in the temporal direct-mode to be output to the direct vector calculation unit 161. A manner of changing the reference vector will be described below.

The direct vector calculation unit 161 subjects the obtained reference vector to scaling at the time allocation and calculates the motion vector of the MB of the coding target (direct vector) (see FIG. 1). The direct vector calculation unit 161 outputs the calculated motion vector to the mode determination unit 162.

The mode determination unit 162 selects the coding mode where the coding cost is the lowest among the above-mentioned five coding modes. The mode determination unit 162 stores the motion vector used in the selected coding mode in the motion vector memory 163 and notifies the motion compensation unit 157 of the selected coding mode.

The motion vector memory 163 stores the motion vector used for the coding. The motion vector stored in the motion vector memory 163 is read out by the motion compensation unit 157 or the like. According to this configuration, when the video on the non-Base-View side is coded, even in the case of the inter-view prediction, the temporal direct-mode may be applied.

Next, the reference vector of the inter-view prediction will be described. According to the present embodiment, when the coding of the non-Base-View is carried out, as illustrated in FIG. 4, even when the vector functioning as the reference is the disparity vector of the inter-view prediction, the temporal direct-mode may be appropriately selected.

A case in which the reference destination of the disparity vector is a P picture will be described. FIG. 4 is an explanatory diagram for describing the reference vector of the inter-view prediction (part 1). Only in the coding on the non-Base-View input side using the information between the disparities (view points), the inter-view prediction is used. Therefore, with regard to the change in the reference vector of the direct vector, only the non-Base-View input side may be taken into account.

Figure 4:
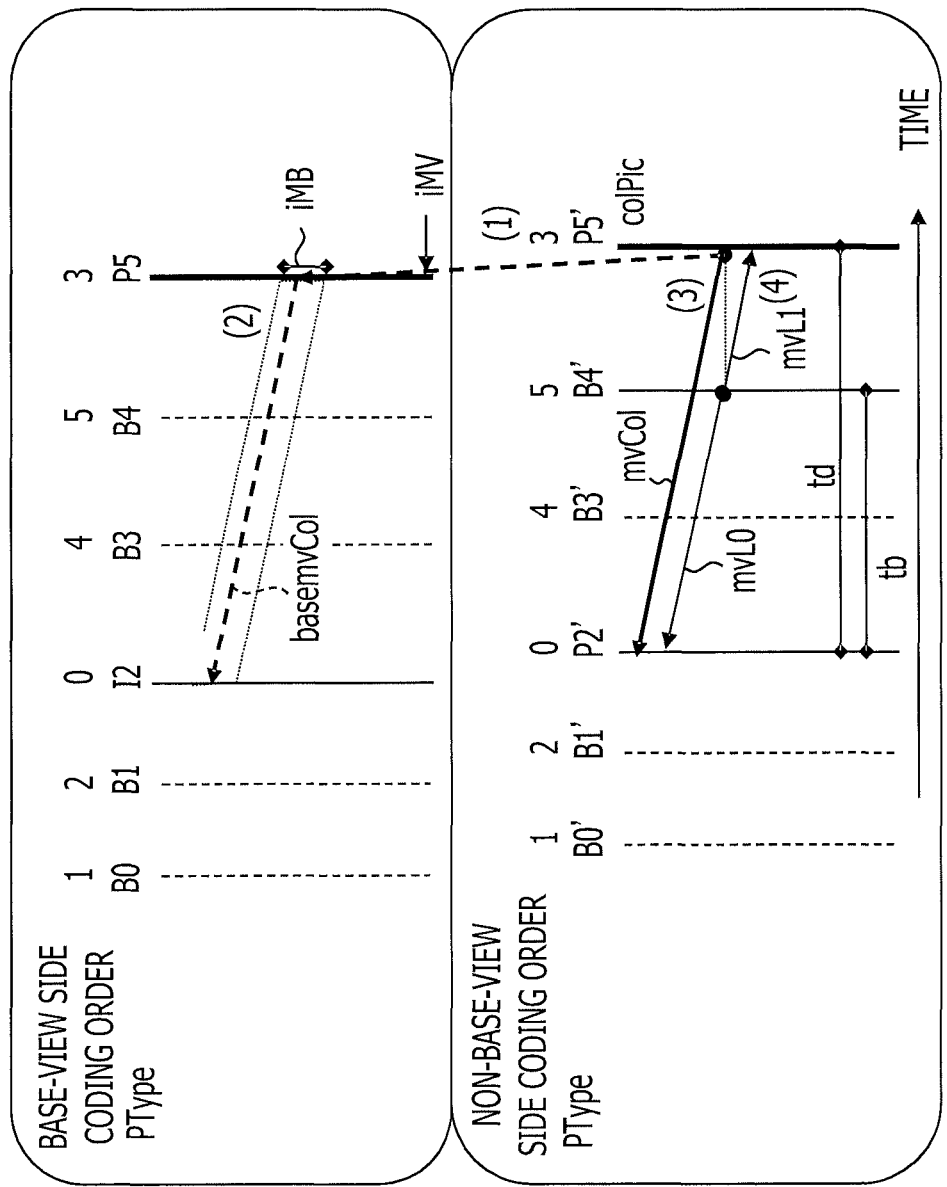
FIG. 4 is an explanatory diagram for describing a reference vector of an inter-view prediction (part 1)

The reference vector determination unit 159 determines whether or not the vector of the block at the same position of the colPic (P5') illustrated in FIG. 4 is the disparity vector. In a case where the vector of the block at the same position is the disparity vector of the inter-view prediction (iMV) (1), the reference vector change unit 160 obtains the motion vector basemvCol in the time direction in the same view point (the Base-View side) belonging to a block iMB to which the iMV of the inter-view prediction refers (2).

The reference vector change unit 160 sets the obtained motion vector basemvCol as the reference vector mvCol in the temporal direct-mode of the MB of the coding target (3).

The direct vector calculation unit 161 subjects the reference vector mvCol to scaling to calculate the direct vectors mvL0 and mvL1 (4). According to this configuration, also in the non-Base-View image of the stereoscopic video, the appropriate direct vectors mvL0 and mvL1 may be calculated, and it is possible to realize the efficient direct-mode.

Figure 5:
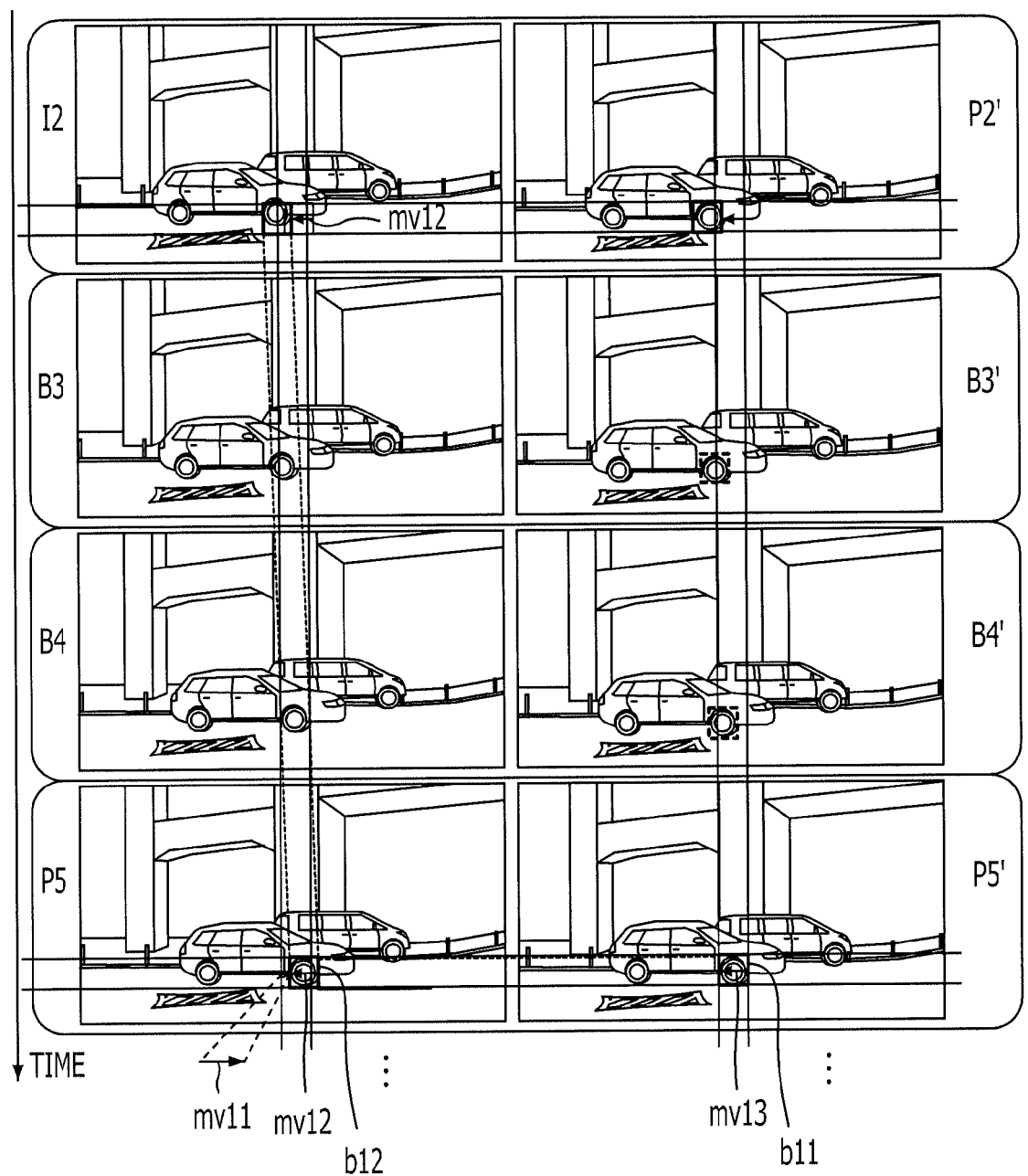
FIG. 5 illustrates an example of a video.

FIG. 5 illustrates an example of a video. The multi-view video illustrated in FIG. 5 is a video obtained by picking an image of a vehicle that traverses from the left of a screen to the right by a left and right twin-lens camera. An image on the left side of FIG. 5 is set as a Base-View image, and an image on the right side is set as a non-Base-View image. According to a time axis of the images illustrated in FIG. 5, the time advances from the top to the bottom of FIG. 5.

An image surrounded by an ellipse illustrated in FIG. 5 is an image of the same time. A front right tire of a vehicle in the center front of the image is a representative example of the block. In FIG. 5, for simplicity, the block including the front right tire is the block at the same position of the colPic. B3' of the non-Base-View is set as the coding target picture. To illustrate the block at the same position b11 of P5' (colPic) of the non-Base-View, the position of the same position is indicated by a solid line.

The reference vector determination unit 159 obtains an inter-view disparity vector mv11 of P5' (colPic) and notifies the reference vector change unit 160 of a block b12 shifted by the inter-view disparity vector mv11 in the Base-View(P5).

The reference vector change unit 160 obtains a motion vector mv12 between I2-P5 in the same view point belonging to the block b12. Therefore, even in a case where a predetermined block of the non-Base-View is the inter-view prediction and the motion vector in the time direction does not exist in the relevant block, it is possible to obtain the motion vector in the temporal direction which is belonging to the Base-View block of the reference destination of the inter-view disparity vector.

By regarding the obtained vector mv12 as a motion vector mv13 in the time direction of the block b11 of the non-Base-View, the reference vector change unit 160 may generate the motion vector mv13 in the time direction (=the reference vector in the temporal direct-mode). The reference vector change unit 160 regards the basemvCol on the Base-View image as the mvCol on the non-Base-View image.

When the reference vector mvCol is obtained, by subjecting the reference vector mvCol to scaling by using a technology in related art, the direct vector calculation unit 161 may obtain the direct vector.

Figure 6:
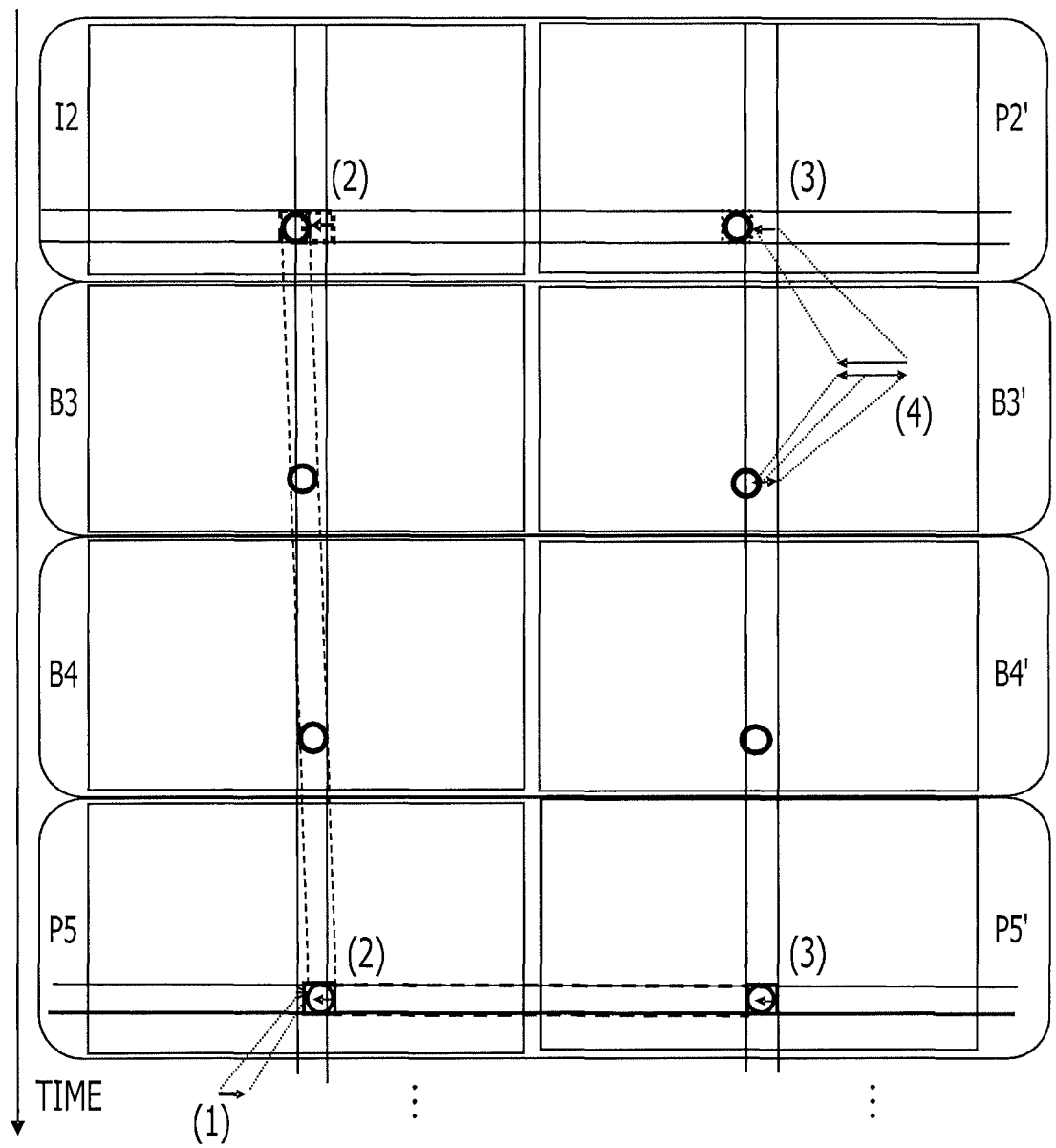
FIG. 6 represents an outline of the image illustrated in FIG. 5 in monochrome (digitalization)

FIG. 6 represents an outline of the image illustrated in FIG. 5 in monochrome (digitalization). (1) to (4) illustrated in FIG. 6 correspond to (1) to (4) illustrated in FIG. 4. In the example illustrated in FIG. 6, a tire of a vehicle is represented by a circle.

As illustrated in FIG. 6, first, the disparity vector of the block at the same position is obtained (1), and the motion vector of the Base-View block to which the disparity vector refers is obtained (2). Next, this motion vector is set as the reference vector (3), and the reference vector is subjected to scaling to obtain the direct vector (4).

Figure 7:
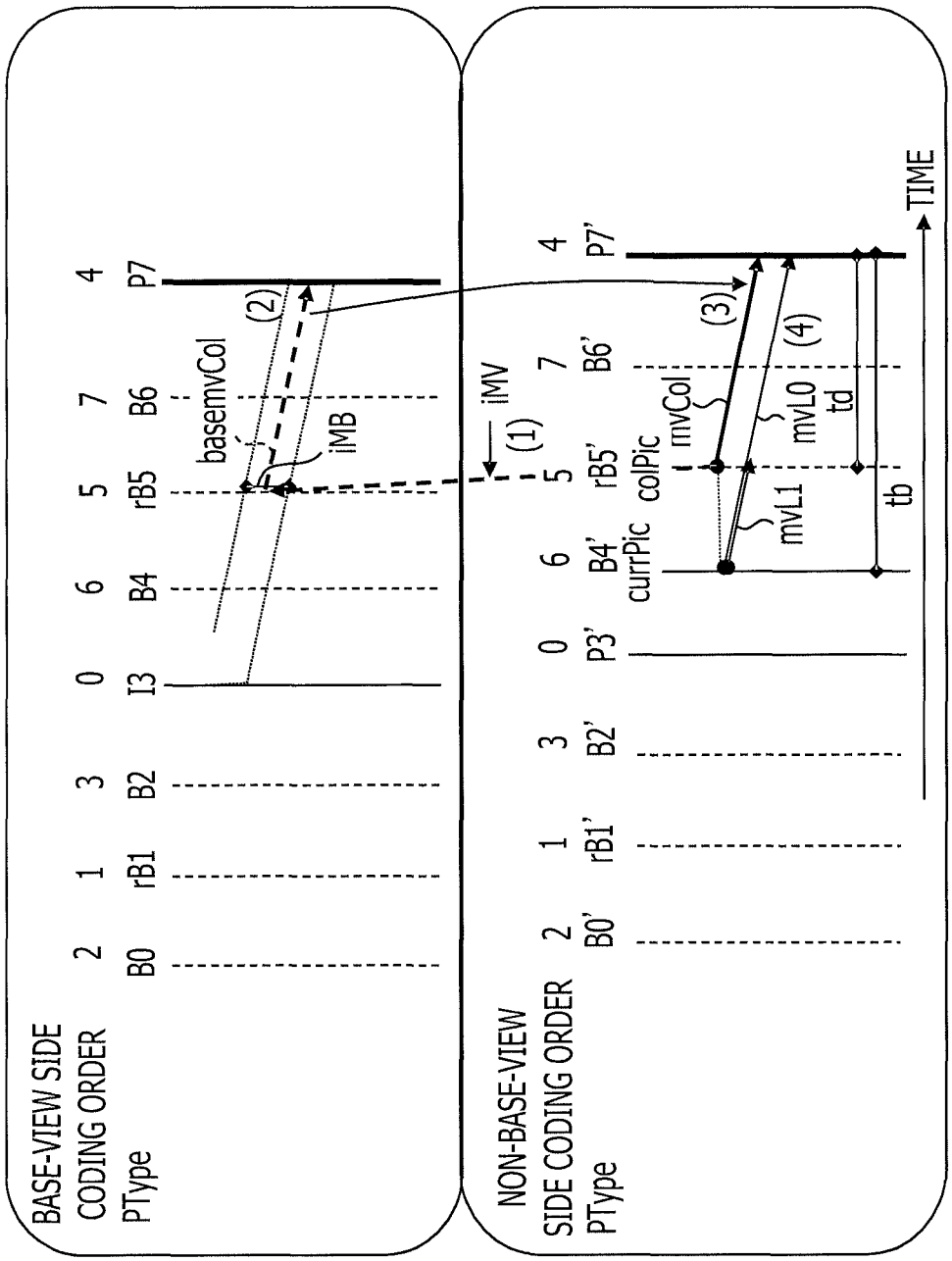
FIG. 7 is an explanatory diagram for describing the reference vector of the inter-view prediction (part 2)

A case in which the reference destination of the disparity vector is a B picture will be described. FIG. 7 is an explanatory diagram for describing the reference vector of the inter-view prediction (part 2). FIG. 7 illustrates a case in which a reference destination picture of the colPic (rB5') is the B picture. FIG. 7 illustrates a picture structure having reference B pictures of B0, rB1, B2, I3, B4, rB5, B6, P7, . . . . rB1 and rB5 are the reference B pictures, and the reference B picture may become a reference picture of another picture.

In the example illustrated in FIG. 7, a coding processing order of the respective Views becomes an order of I3, rB1, B0, B2, P7, rB5, B4, B6, . . . . (1) to (4) illustrated in FIG. 7 indicate a calculation procedure for the direct vector similarly as in (1) to (4) illustrated in FIG. 4.

The reference vector determination unit 159 determines whether or not the vector of the block at the same position of the colPic (rB5') illustrated in FIG. 7 is the disparity vector. In a case where the vector of the block at the same position is the disparity vector of the inter-view prediction (iMV) (1), the reference vector change unit 160 obtains the motion vector basemvCol in the time direction in the same view point (the Base-View side) belonging to the block iMB to which iMV of the inter-view prediction refers (2).

For example, in a case where the iMB is the reference B picture, two motion vectors exist. At this time, in a case where the motion vector belonging to the iMB is the motion vector of the forward prediction or the bi-directive prediction, the reference vector change unit 160 preferentially sets the motion vector in the forward direction as the basemvCol. According to this configuration, in a case where the motion vector in the forward direction is set as the basemvCol, it is possible to carry out a processing similar to a case where the iMB is the P picture.

The reference vector change unit 160 performs a processing illustrated in FIG. 7 in a case where the iMB has only the motion vector of the backward prediction. As illustrated in FIG. 7, the reference vector change unit 160 sets the motion vector of the backward prediction as the basemvCol (2).

The reference vector change unit 160 sets the obtained motion vector basemvCol as the reference vector mvCol in the temporal direct-mode of the MB of the coding target (3).

The direct vector calculation unit 161 subjects the reference vector mvCol to scaling to calculate the direct vectors mvL0 and mvL1 (4).

For example, as illustrated in FIG. 7, in a case where the backward motion vector is set as the reference vector, in a concept of the temporal direct, a time distance between the colPic (rB5') and the refPicCol (P7') is set as td, and a time distance between the currPic (rB5') and the refPicCol (P7') is set tb. As illustrated in FIG. 7, the direct vector calculation unit 161 obtains the temporal direct vectors mvL0 and mvL1 through the following expression. mvL0=tb/td× mvColmvL1=mvL0−mvCol According to this configuration, even when the block of another view point to which the vector of the block at the same position refers is the bi-directive prediction, the appropriate direct vectors mvL0 and mvL1 may be calculated, and it is possible to realize the efficient direct-mode.

Figure 8:
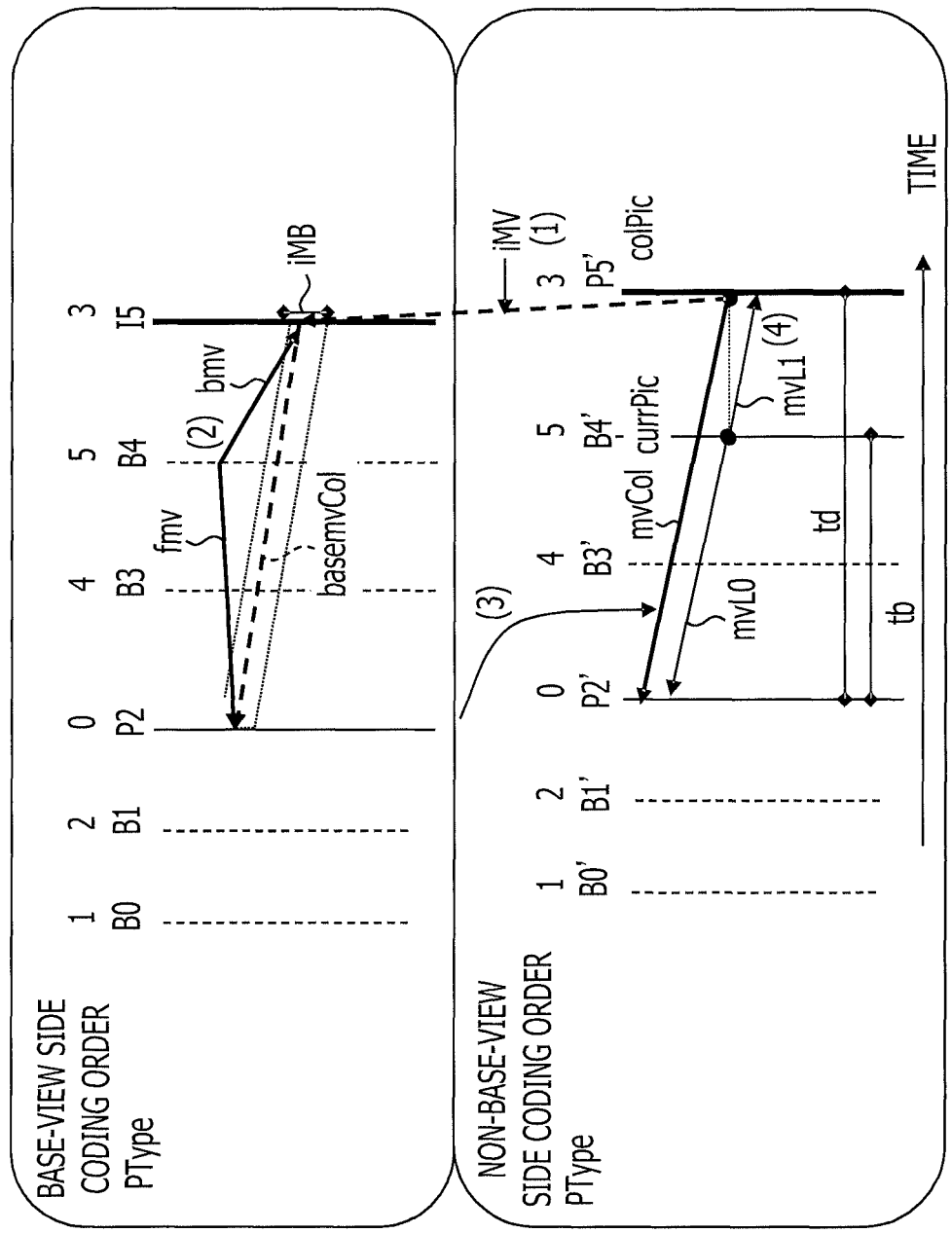
FIG. 8 is an explanatory diagram for describing the reference vector of the inter-view prediction (part 3)

A case in which the reference destination of the disparity vector is an I picture will be described. FIG. 8 is an explanatory diagram for describing the reference vector of the inter-view prediction (part 3). FIG. 8 illustrates a case in which the reference destination picture of the colPic (P5') is the I picture. When the iMB to which iMV refers is decided, if a picture including the iMB is the I picture, since iMV does not have the motion vector, the basemvCol is obtained from the motion vector of the picture already processed (for coding/decoding).

In the example illustrated in FIG. 8, a coding processing order of the respective Views becomes an order of P2, B0, B1, I5, B3, B4, . . . . (1) to (4) illustrated in FIG. 8 indicate a calculation procedure for the direct vector similarly as in (1) to (4) illustrated in FIG. 4.

The reference vector determination unit 159 determines whether or not the vector of the block at the same position of the colPic (P5') illustrated in FIG. 8 is the disparity vector. In a case where the vector of the block at the same position is the disparity vector of the inter-view prediction (iMV) (1), the reference vector change unit 160 determines whether or not the block iMB to which iMV of the inter-view prediction refers has the motion vector.

In a case where the iMB does not have the motion vector in the intra prediction, the reference vector change unit 160 searches for the block referring to the iMB from the coded picture. As illustrated in FIG. 8, the motion vector referring to the iMB is set as bmv, and in a case where a block having this bmv has another motion vector, the other motion vector is set as fmv.

At this time, the reference vector change unit 160 obtains the motion vector basemvCol through the following expression (2). basemvCol=fmv−bmv Also, in a case where a block having the motion vector bmv referring to the iMB does not have another motion vector, the reference vector change unit 160 obtains the basemvCol at a time ratio the following expression (2).

$$basemvCol = -td/(td-tb) \times bmv$$

FIG. 8 illustrates an example of obtaining the basemvCol by using the motion vector of B4. In a case where the coding target picture (currPic) is B4', the picture of B4 is processed (for coding/decoding). If the picture of B4 is not processed, the inter-view reference may not be carried out with the relevant picture, and therefore the motion vector of B4 has been subjected to the calculation.

If the motion vector has been subjected to the calculation, the calculated motion vector is accumulated and stored in the motion vector memory 112 by one picture. The reference vector change unit 160 obtains the motion vector in which the iMB is set as the reference destination from the stored motion vectors.

In a case where this motion vector exists, the reference vector change unit 160 selects the motion vector of the bi-directive (forward, backward) prediction to have a high priority as compared with the one-way (backward) prediction and also selects the motion vector of the forward prediction to have a high priority, and selects the motion vector having a large area overlapped with the iMB to have a high priority, and the like. Also in a case where the obtained motion vector is the bi-directive prediction and fmv or bmv or a case where the obtained motion vector is the backward prediction and bmv, the reference vector change unit 160 may make the obtainment through the above-mentioned expression.

The reference vector change unit 160 sets the obtained motion vector basemvCol as the reference vector mvCol in the temporal direct-mode of the MB of the coding target (3).

The direct vector calculation unit 161 subjects the reference vector mvCol to scaling to calculate the direct vectors mvL0 and mvL1 (4).

In FIG. 8, the example in which the reference vector change unit 160 uses the motion vector of B4 has been illustrated, but the motion vector of B3 which is the picture processed in the past may be used. In a case where the motion vector in which the iMB is set as the reference destination does not exist, the reference vector change unit 160 does not perform the calculation for the temporal direct vector.

In a case where the calculation for the temporal direct vector is not performed, some variations are conceivable including a method of performing a calculation for the temporal direct-mode while the basemvCol is set as 0 vector, a method of switching to a calculation for the spatial direct-mode only for the relevant block, and the like.

To summarize the above, according to the first embodiment, the video coding device 100 has the following configuration and function. •The initial value of the mvCol is set as the vector belonging to the block at the same position as the current MB of the colPic similarly as in related art. •In a case where the mvCol indicates the inter-view prediction, the scaling processing at the time allocation may not be carried out since the time difference is 0. However, if the picture at the reference destination of the inter-view prediction is the Base-View, an attention is paid to a point that the picture of the relevant Base-View performs the reference in the time direction in the same view point. •The disparity vector of the inter-view prediction is set as iMV, and the block in the Base-View picture at the reference destination of iMV is set as the iMB. The position of the iMB is shifted in many cases from the block border in the coding unit as illustrated in a second embodiment which will be described below but may be obtained uniquely. The iMB is set as the candidate block position for obtaining the motion vector of the mvCol, and the motion vector where the reference in the time direction in the Base-View is carried out while the iMB is set as the reference source is obtained. By using MV information of a certain block a part of which is overlapped with the iMB, the obtained motion vector is set as the basemvCol. The basemvCol is changed to the reference vector mvCol. With respect to the obtained reference vector mvCol, the temporal direct vector is calculated.

Figure 9:
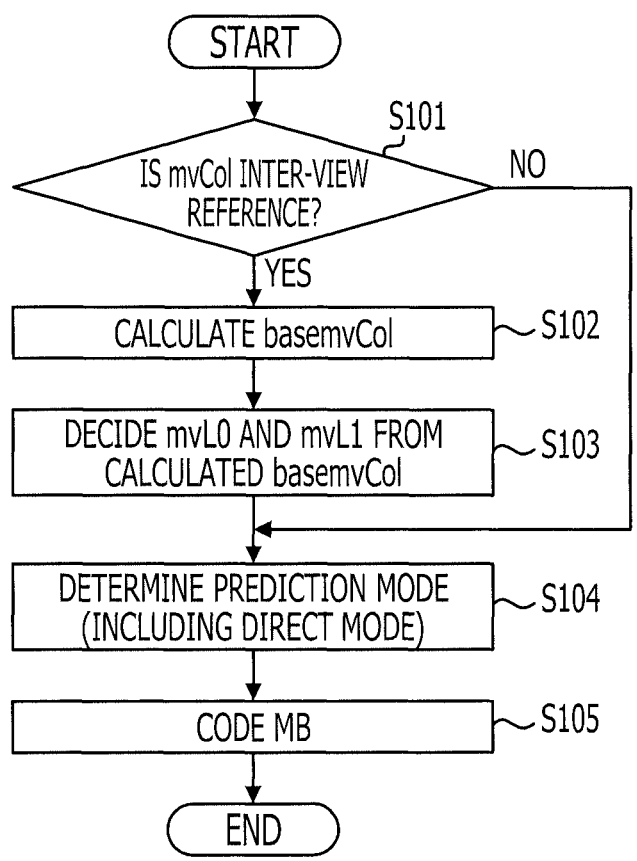
FIG. 9 is a flow chart illustrating an example of a coding processing according to the first embodiment.

Next, an operation of the video coding device 100 according to the first embodiment will be described. FIG. 9 is a flow chart illustrating an example of a coding processing according to the first embodiment. The processing illustrated in FIG. 9 is a coding processing for the multi-view video and indicates a bi-directive coding processing on the non-base-view side.

In operation S101, the reference vector determination unit 159 determines whether or not the vector belonging to the block at the same position of the coding target block is the disparity vector (whether or not the inter-view reference is carried out). In the case of the inter-view reference (operation S101—Yes), the flow progresses to operation S102, and in the case of the reference in the same view point (operation S101—No), the flow progresses to operation S104.

In operation S102, the reference vector change unit 160 obtains the basemvCol of the block pointed by the disparity vector belonging to the block at the same position.

In operation S103, the direct vector calculation unit 161 performs scaling with the time difference by using the reference vector and calculates the direct vectors mvL0 and mvL1.

In operation S104, the mode determination unit 162 selects a coding mode in which the coding cost becomes the smallest among a plurality of coding modes including the direct-mode.

In operation S105, the prediction error generation unit 151, the orthogonal transform/quantization unit 152, and the variable length coding unit 153 performs the coding of the coding target block in the selected coding mode.

According to this configuration, the coding processing for 1 MB is ended. The coding processing other than the temporal direct-mode is similar to the coding processing in related art.

As described above, according to the first embodiment, in the multi-view video coding processing, the temporal direct-mode is used in the inter-view prediction, and the coding efficiency may be increased.

Next, a video coding device 200 according to the second embodiment will be described. According to the second embodiment, even in a case where the block iMB to which the disparity vector of the block at the same position refers to is shifted from the block border in the coding unit of the Base-View, it is possible to obtain the reference vector.

Figure 10:
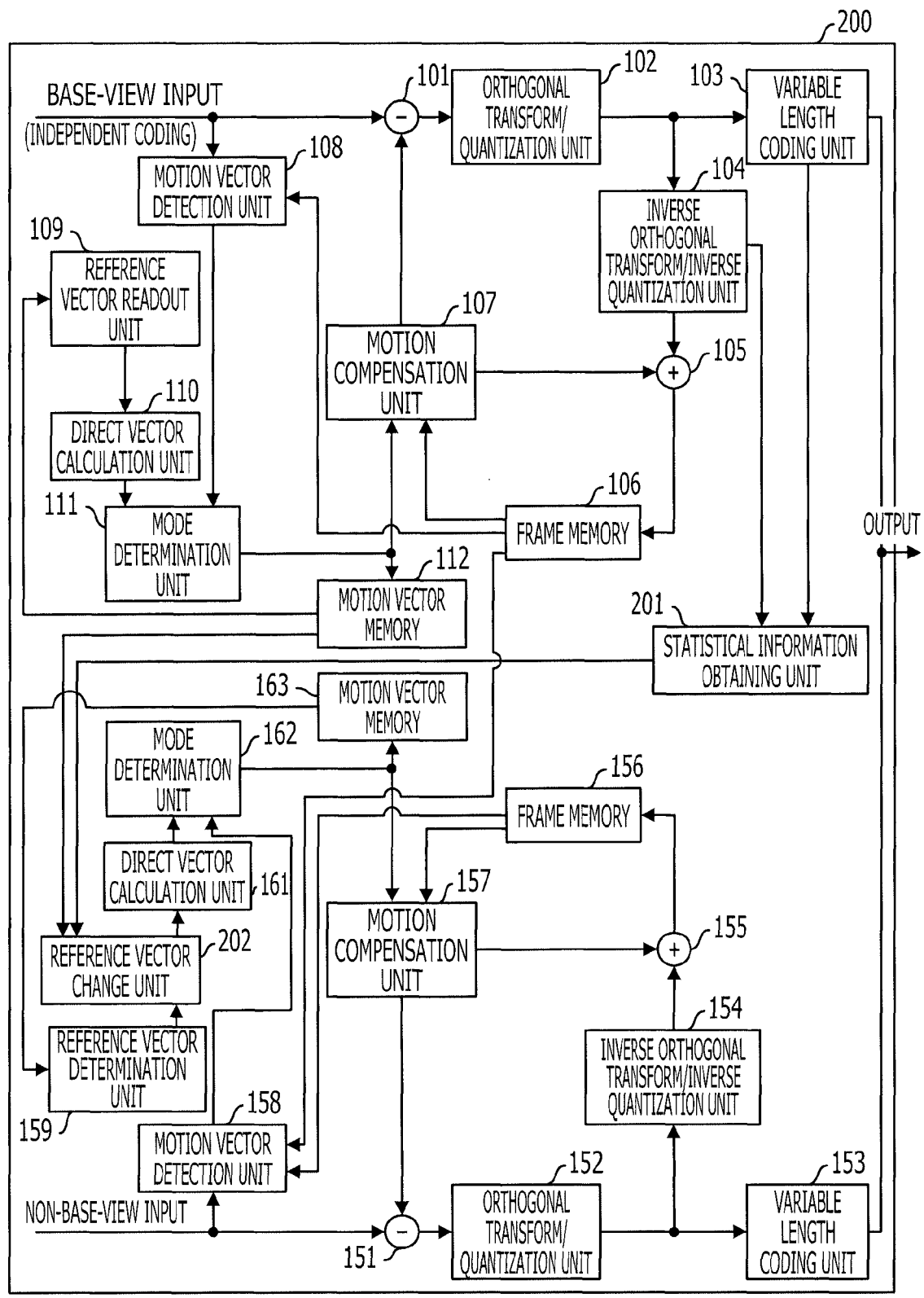
FIG. 10 is a block diagram illustrating an example of a configuration of a video coding device according to a second embodiment.

FIG. 10 is a block diagram illustrating an example of a configuration of the video coding device 200 according to the second embodiment. Configurations illustrated in FIG. 10 similar to the configurations illustrated in FIG. 3 are assigned with the same reference symbols, and a description thereof will be omitted.

A statistical information obtaining unit 201 obtains statistical information on the Base-View coding. The statistical information includes, for example, a qP value (quantization scale value) when the coding block is quantized and the number of the differential effectiveness factors.

When the non-Base-View video is subjected to the coding processing as the coding of the multi-view video, since the coding processing of the Base-View video at the same time point has been completed, the statistical information obtaining unit 201 may obtain the statistical information on the coding of the Base-View video.

A reference vector change unit 202 calculates the reference vector on the basis of the motion vectors of a plurality of blocks overlapped with the block iMB to which the disparity vector refers. If needed, the reference vector change unit 202 obtains the statistical information at the time of the coding of the blocks overlapped with the iMB from the statistical information obtaining unit 201. A plurality of calculation methods for the reference vector in this case exist, and the methods will be described below in sequence.

A calculation method 1 for the reference vector will be described. In a case where the plurality of blocks overlapped with the iMB exist, the reference vector change unit 202 selects a representative motion vector among the respective blocks to be set as the reference vector. The reference vector change unit 202 sets, for example, the motion vector of the block including the center position of the iMB (the block where the overlapping area is largest) as the reference vector.

Figure 11:
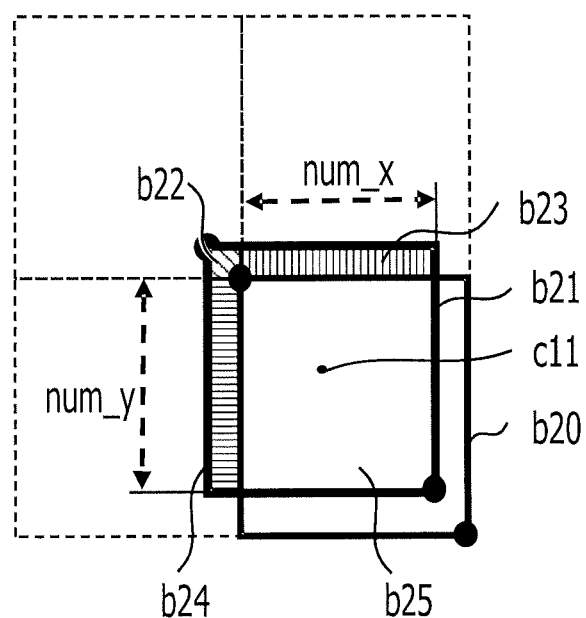
FIG. 11 illustrates a block including a center position of iMB.

FIG. 11 illustrates a block including a center position of the iMB. In the example illustrated in FIG. 11, the block iMB straddles across regions of four blocks.

Herein, the reference destination of the disparity vector (iMV=(x, y)) belonging to the block at the same position of the non-Base-View (MB or a sub block) is set as the block iMB b21 in the Base-View picture. The MB size (or sub block) of the reference destination picture is N×M.

At this time, the block b21 moved by the amount of the disparity vector straddles across four regions b22 to b25. The areas of the respective regions ($num\_x_i$: transverse length, $num\_y_i$: longitudinal length) are the area b25 (num_x, num_y), the area b24 (N−num_x, num_y), the area b23 (num_x, M−num_y), and the area b22 (N−num_x, M−num_y).

The reference vector change unit 202 obtains the areas of the respective regions and performs a magnitude comparison between the respective areas, so that the motion vector of the block including the region having the largest area is set as the reference vector. In the case illustrated in FIG. 11, the motion vector of a block b20 including the area b25 becomes the reference vector.

Also, the reference vector change unit 202 may set the motion vector of the block b20 including a center position c11 of the block iMB as the reference vector. In this case, the block b20 in the Base-View including the position (a+x, b+y) which is shifted by iMV=(x, y) from the center position c11 (a, b) of the iMB (or the sub block) is uniquely obtained. Therefore, it suffices that the reference vector change unit 202 sets the motion vector used for coding the block b20 as the reference vector basemvCol.

A calculation method 2 for the reference vector will be described. In a case where a plurality of blocks (or sub blocks) overlapped with the iMB exist, the reference vector change unit 202 subjects the motion vectors of the respective blocks at a size of the overlapping area to weighted averaging and sets this weighted average motion vector as the reference vector. In the following, a consideration will be given while the area corresponds to the number of pixels.

Figure 12:
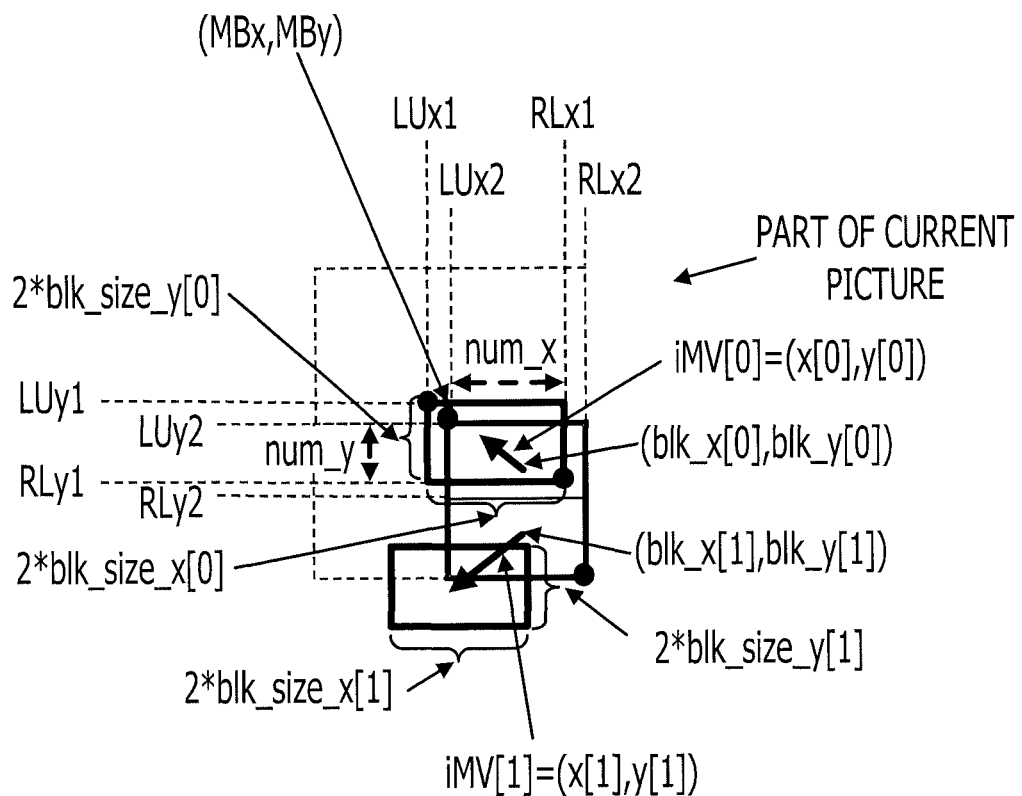
FIG. 12 illustrates an example of a case in which a sub block exists.

FIG. 12 illustrates an example of a case in which a sub block exists. In the example illustrated in FIG. 12, the disparity vector of the same position MB (or the sub block) is set as iMV[i] (=(x[i], y[i])). Also, a position in the picture of the upper left pixel of the same position MB is set as (MBx, MBy), and a positional shift from the upper left pixel of the MB with respect to the center pixels of the respective sub blocks in the same position MB is set as (blk_x[i], blk_y[i]).

Also, the horizontal and vertical sizes of the respective sub blocks are set as (2×blk_size_x[i], 2×blk_size_y[i]). Therefore, the sizes of the respective sub blocks are a rectangle in which the upper left is set as (MBx+blk_x[i]+x[i]−blk_size_x[i], MBy+blk_y[i]+y[i]−blk_size_y[i]) and the lower right is set as (MBx+blk_x[i]+x[i]+blk_size_x[i]−1, MBy+blk_y[i]+y[i]+blk_size_y[i]−1).

The reference vector change unit 202 calculates this rectangular block includes which sub block region in the refPicCol by how many pixels. When a description similar to the above-mentioned expression is given, in the sub block in the refPicCol, the upper left is set as (MBx+blk_x[j]−blk_size_x

[j], MBy+blk_y[i]−blk_size_y[j]) and the lower right is set as (MBx+blk_x[j]+blk_size_x[j]−1, MBy+blk_y[j]+blk_size_y[j]−1) (0≤j<MAX_MV_NUMREFCOL: MAX_MV_NUMREFCOL denotes the number of divisions of the MB of the reference destination MB of colMB in the refPicCol).

Since this may be represented in a form where the motion vector is removed, the reference vector change unit 202 divides the sub block in the unit equivalent to the sub block in the refPicCol on the basis of the magnitude relationship of the sub blocks.

Figure 13:
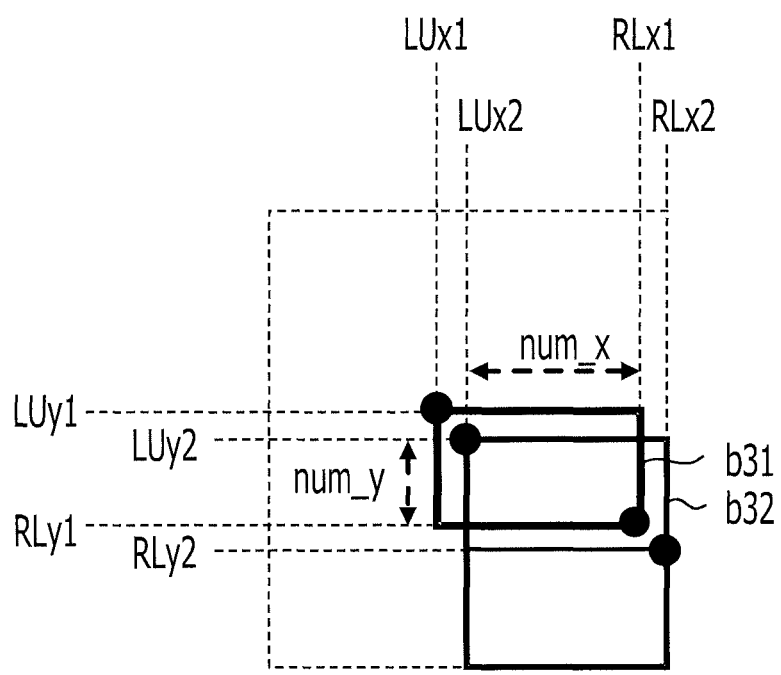
FIG. 13 illustrates an example of a reference sub block exists in refPicCol.

FIG. 13 illustrates an example of a reference sub block exists in the refPicCol. In the example illustrated in FIG. 13, for simplicity, the reference sub block in the refPicCol to which the colPic refers is set as (LUx1, LUy1)−(RLx1, RLy1), and the sub block in the refPicCol is set as (LUx2, LUy2)−(RLx2, RLy2).

The reference sub block in the refPicCol is as follows. (LUx1, LUy1)=(MBx+blk_x[j]−blk_size_x[j], MBy+blk_y[i]−blk_size_y[j]) (RLx1, RLy1)=(MBx+blk_x[j]+blk_size_x[j]−1, MBy+blk_y[j]+blk_size_y[j]−1)

The sub block in the refPicCol is as follows. (LUx2, LUy2)=(MBx+blk_x[k]−blk_size_x[k], MBy+blk_y[k]−blk_size_y[k]) (RLx2, RLy2)=(MBx+blk_x[k]+blk_size_x[k]−1, MBy+blk_y[k]+blk_size_y[k]−1)

To simplify the description, the description has been given while separating horizontal components and vertical components. According to the described contents, the number of overlapping horizontal pixels (num_x) is obtained on the basis of a positional relationship between four points in total including two points of the horizontal components on the upper left end and the lower right end of a block b31 and two points of the horizontal components on the upper left end and the lower right end of a block b32.

When the horizontal components are changed to the vertical components, the number of overlapping vertical pixels (num_y) is obtained. When the block (reference block) b31 is shifted with respect to the coding block, since overlapping parts with a plurality of blocks exist, the reference vector change unit 202 is configured to perform an overlapping determination by several times.

The reference vector change unit 202 obtains the number of pixels of the reference sub block included in each sub block of the refPicCol (equivalent to the area) through the following expression. The number of pixels of the horizontal components if (RLx2<LUx1∥LUx2>RLx1) {num_x=0;} else if (LUx2<LUx1) {if (RLx2<RLx1) {num_x=RLx2−LUx1;} else {num_x=RLx1−LUx1;}} else {if (RLx2<RLx1) {num_x=RLx2−Lux2;} else {num_x=RLx1−Lux2;}}

The number of pixels in the horizontal direction if (RLy2<LUy1∥LUy2>RLy1) {num_y=0;} else if (LUy2<LUy1) {if (RLy2<RLy1) {num_y=RLy2−LUy1;} else {num_y=RLy1−LUy1;}} else {if (RLy2<RLy1) {num_y=RLy2−LUy2;} else {num_y=RLy1−LUy2;}}

The reference vector change unit 202 multiplies the obtained num_x by the obtained num_y, the resultant becomes the number of pixels of the reference sub block included in the sub block in the refPicCol.

The largest value of the size of the reference sub block is the MB size, and the upper left pixel position of the reference sub block is included in one of the MBs in the refPicCol. When the relevant MB is set as MBlu, the above-mentioned calculation may be performs at most at 4 MB of the MBlu, the MB on the right of the MBlu, the lower MB of the MBlu, and the lower right MB of the MBlu.

The reference vector change unit 202 calculates the weighted average of the basemvCol as the motion vector through the following expression.

$$(basemvColX[i], basemvColY[i]) =$$
$$\left(\left(\sum_{sub\_mb} MVx[sub\_mb] * num\_x * num\_y\right) \middle/ ((RLx1 - LUx1)*(RLy1 - LUy1)),\right.$$
$$\left.\left(\sum_{sub\_mb} MVy[sub\_mb] * num\_x * num\_y\right) \middle/ ((RLy1 - LUy1)*(RLy1 - LUy1))\right)$$

According to this configuration, the reference vector change unit 202 may obtain the weighted average basemvCol in proportion to the number of pixels in the overlapping region.

Also, the reference vector change unit 202 may multiply the number of pixels in the overlapping region by a weighting coefficient K to obtain an evaluation value and calculate the basemvCol in accordance with the evaluation value. The calculation method at the time will be described below.

$$Costxy_i = K * (num\_x_i * num\_y_i)(basemvColX, basemvColY) =$$
$$\left(\sum_{block} (MVx_{block} * Costxy_{block}) \middle/ \sum_{block} Costxy_{block},\right.$$
$$\left.\sum_{block} (MVy_{block} * Costxy_{block}) \middle/ \sum_{block} Costxy_{block}\right)$$

K: weighting coefficient, $Costxy_i$: evaluation value

According to this configuration, the reference vector change unit 202 may obtain the average vector of the respective blocks in accordance with and set this average vector as the reference vector basemvCol.

A calculation method 3 for the reference vector will be described. In a case where a plurality of blocks (or the sub block) overlapped with the disparity vector iMB exist, the reference vector change unit 202 calculates confidence coefficients of the respective blocks on the basis of the size of the overlapping area and the statistical information at the time of the coding and sets the motion vector weighted-averaged by the confidence coefficients as the reference vector.

The reference vector change unit 202 obtains the statistical information at the time of the coding of the plurality of blocks overlapped with the iMB (for example, the blocks b22 to b25 illustrated in FIG. 11) from the statistical information obtaining unit 201. The statistical information is, for example, the qP value (quantization scale value) and the number of the differential effectiveness factors.

The reference vector change unit 202 calculates the confidence coefficient on the basis of the size of the area of the block overlapped with the iMB, the qP values (quantization scale values) of the respective blocks, and the number of the differential effectiveness factors. The reference vector change unit 202 performs weighting of the motion vectors of the respective blocks on the basis of this confidence coefficient.

For example, if the number of the differential effectiveness factors used for the coding or the absolute value of the component is small, it is possible to determine that the prediction for the relevant block is appropriately correct. Also, if the differential effectiveness factor is at the same level, the difference is smaller as the used qP value is smaller, and it is possible to determine that the prediction is correct.

On the basis of this idea, the confidence coefficient is calculated, for example, through the following expression.

$$\text{Confixy}_i = (\alpha * \text{num\_}x_i * \text{num\_}y_i / (\beta * qP_i * \gamma * \text{numCoef}_i))$$

Confixy$_i$: confidence coefficient, qP$_i$: qP value, numCoef$_i$: the number of the differential effectiveness factors, $\alpha$ ($0 \le \alpha \le 1$): weighting coefficient with respect to the number of pixels, $\beta$ ($0 \le \beta \le 1$): weighting coefficient $\gamma$ with respect to the qP value ($0 \le \gamma \le 1$):

The respective weighting coefficients respect to the number of effectiveness factors are set, for example, as $\alpha = 0.3$, $\beta = 0.7$, and $\gamma = 0.2$, but these values may be set as appropriate values through an experiment or the like.

The reference vector change unit 202 obtains the average vector of the respective blocks in accordance with the confidence coefficient and sets this average vector as the reference vector basemvCol. The reference vector may be obtained, for example, through the following expression.

$$(basemvColX, basemvColY) = \left( \sum_{block} (MVx_{block} * \text{Confixy}_{block}) \Big/ \sum_{block} \text{Costxy}_{block}, \sum_{block} (MVy_{block} * \text{Confixy}_{block}) \Big/ \sum_{block} \text{Confixy}_{block} \right)$$

According to this configuration, the reference vector change unit 202 may obtain the average vector of the respective blocks in accordance with confidence coefficients of the respective blocks and set this average vector as the reference vector basemvCol.

The reference vector change unit 202 may previously set one calculation method among the plurality of above-mentioned calculation methods for the reference vector.

Figure 14:
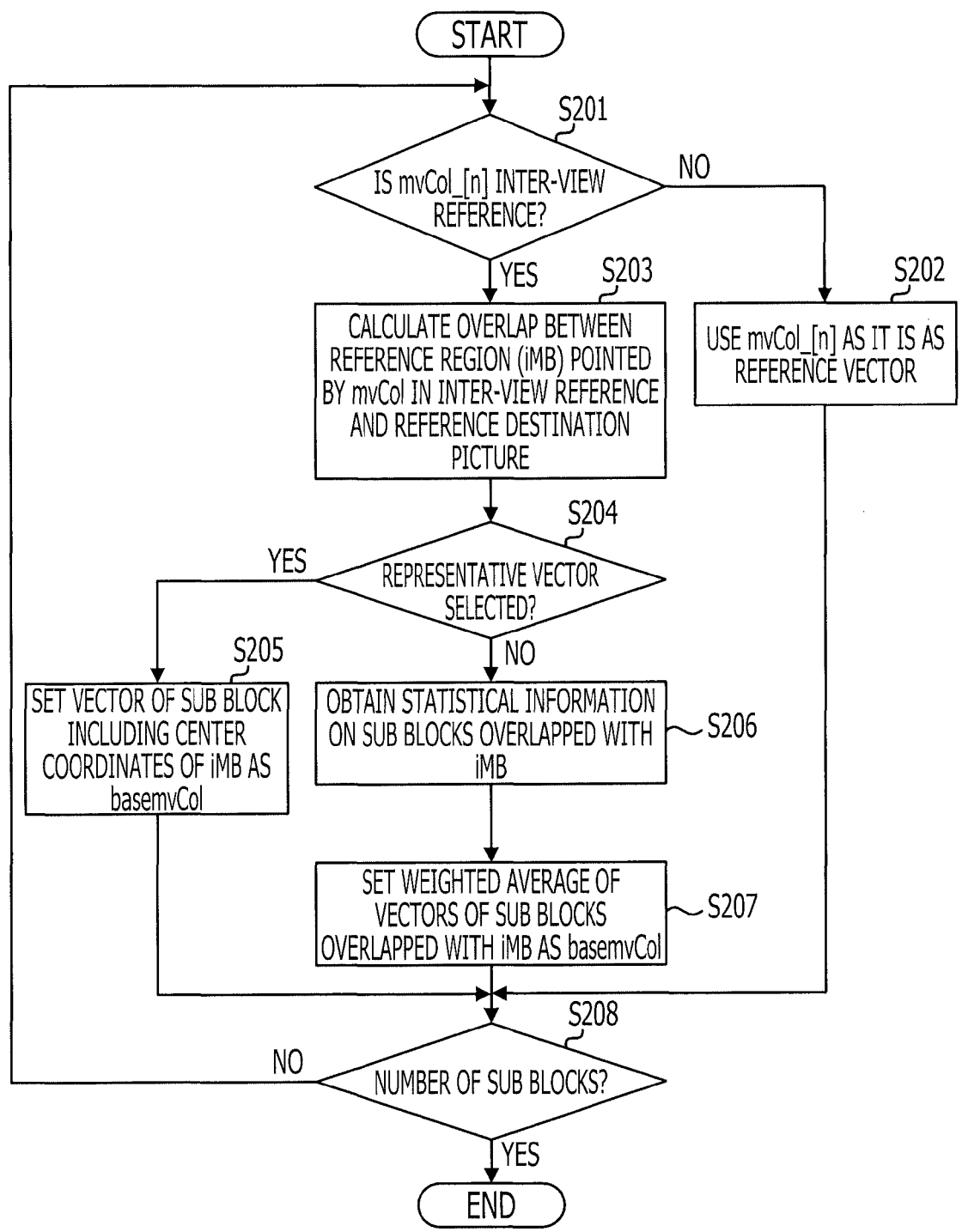
FIG. 14 is a flow chart illustrating an example of a calculation processing for a reference vector according to the second embodiment.

Next, an operation of the video coding device 200 according to the second embodiment will be described. FIG. 14 is a flow chart illustrating an example of a calculation processing for a reference vector according to the second embodiment.

In operation S201 illustrated in FIG. 14, the reference vector change unit 202 determines whether or not the mvCol_[n] performs a inter-view reference (whether to have a disparity vector). In a case where the mvCol_[n] performs the inter-view reference (operation S201—Yes), the flow progresses to operation S203, and in a case where the mvCol_[n] performs the reference in the same view point (operation S201—No), the flow progresses to operation S202.

In operation S202, the reference vector change unit 202 uses the read out the mvCol_[n] as the reference vector. At this time, it suffices that the reference vector determination unit 159 outputs all the mvCol read out from the motion vector memory 163 to the reference vector change unit 202.

In operation S203, the reference vector change unit 202 calculates an overlapping of the reference destination region iMB to which the mvCol refers in the inter-view prediction with the coding block of the reference destination picture.

In operation S204, the reference vector change unit 202 determines whether or not a setting for selecting a representative vector is made. When the setting for selecting the representative vector is made (operation S204—Yes), the flow progresses to operation S205, and when the setting for selecting the representative vector is not made (operation S204—No), the flow progresses to operation S206.

In operation S205, the reference vector change unit 202 sets the motion vector of the sub block including the center coordinates of the iMB as the reference vector.

In operation S206, the reference vector change unit 202 obtains the statistical information at the time of the coding of the sub blocks overlapped with the iMB from the statistical information obtaining unit 201.

In operation S207, the reference vector change unit 202 performs weighted averaging of the motion vector of the sub block in accordance with the area of the sub block overlapped with the iMB or the confidence coefficient based on the area of the sub block and the statistical information at the time of the coding and sets this average motion vector as the reference vector.

In operation S208, the reference vector change unit 202 determines whether the processing is carried out by the number of sub blocks of the block at the same position. If the processing is carried out by the number of sub blocks (operation S208—Yes), this calculation processing is ended, and if the processing is not carried out by the number of sub blocks (operation S208—No), the flow returns to operation S201.

According to this configuration, even in a case where the reference vector change unit 202 performs the inter-view reference, the temporal direct-mode may be used, and it is possible to use the appropriate reference vector.

Figure 15:
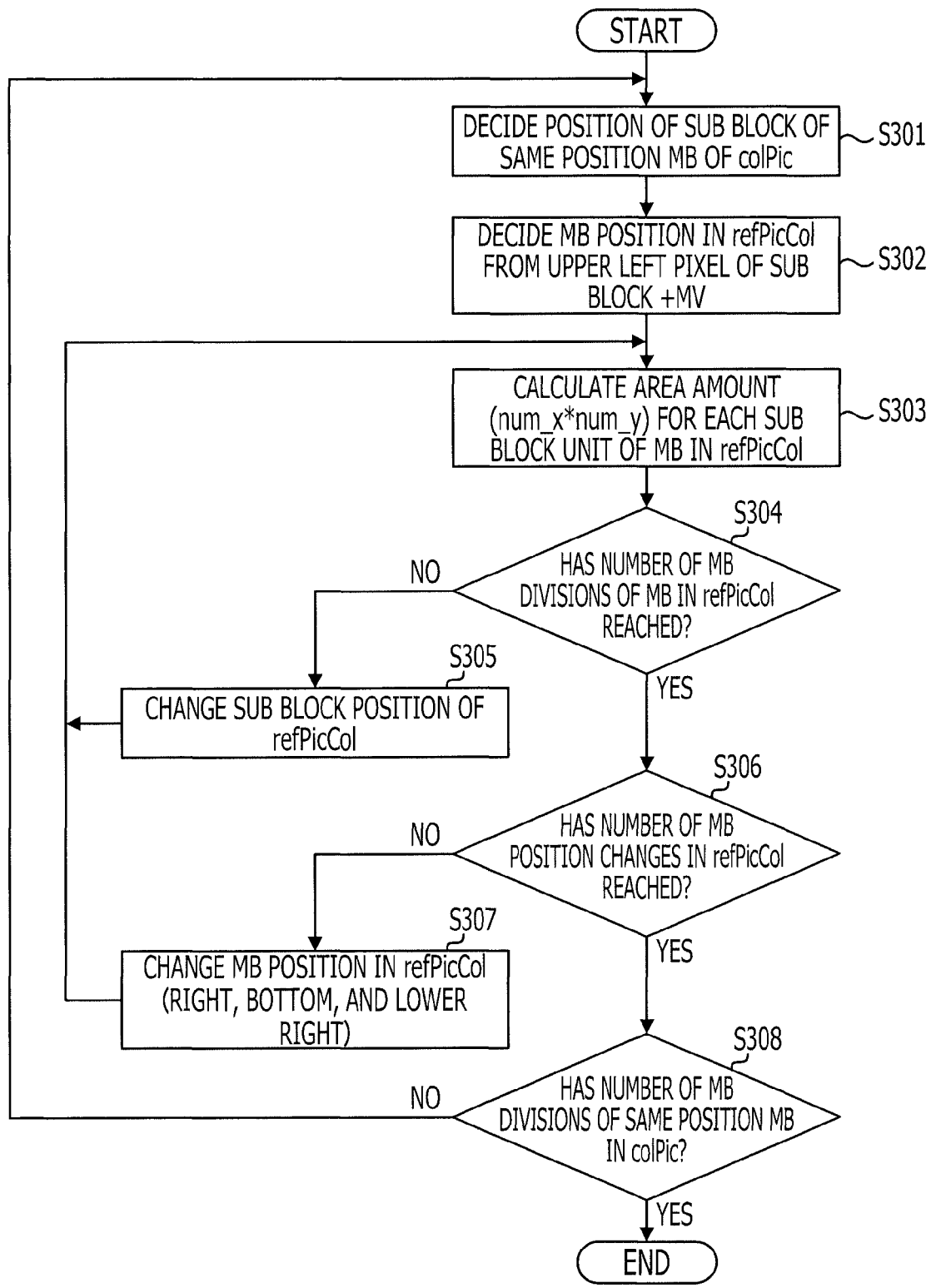
FIG. 15 is a flow chart illustrating an example of a processing of calculating an area of a sub block overlapped with the iMB.

FIG. 15 is a flow chart illustrating an example of a processing of calculating an area of a sub block overlapped with the iMB. In operation S301 illustrated in FIG. 15, the reference vector change unit 202 decides a position of the sub block with respect to the same position MB of the colPic.

In operation S302, the reference vector change unit 202 moves the sub block by the amount corresponding to the disparity vector and decides a position of the MB in the refPicCol from the upper left pixel of the relevant block. The refPicCol is the reference destination picture of the Base-View to which the disparity vector refers.

In operation S303, the reference vector change unit 202 calculates the area (num_x×num_y) for each sub block unit of the MB in the refPicCol.

In operation S304, the reference vector change unit 202 determines whether or not the number of MB divisions of the MB in the refPicCol is reached. If the number of MB divisions is reached (operation S304—Yes), the flow progresses to operation S306, and if the number of MB divisions is not reached (operation S304—No), the flow progresses to operation S305.

In operation S305, the reference vector change unit 202 changes the position of the sub block of the refPicCol. After the processing of operation S305, the flow returns to operation S303.

In operation S306, the reference vector change unit 202 determines whether or not the number of position changes of the MB in the refPicCol is reached. The number of MB position changes is reached (operation S306—Yes), the flow progresses to operation S308, and the number of MB position changes is not reached (operation S306—No), the flow progresses to operation S307. The number of MB position changes is, for example, 3 (right, bottom, and lower right).

In operation S307, the reference vector change unit 202 changes the position of the MB in the refPicCol. For example, the position is changed in the order of right, bottom, and lower right. After the processing of operation S307, the flow returns to operation S303.

In operation S308, the reference vector change unit 202 determines whether or not the number of divisions of the same position MB of the colPic is reached. If the number of divisions of the same position MB is reached (operation S308—Yes), this area calculation processing is ended, and if the number of divisions is not reached (operation S308—No), the flow returns to operation S301. The number of divisions of the same position MB is, for example, the number of sub blocks of the same position MB.

As described above, according to the second embodiment, even in a case where the block iMB to which the disparity vector of the block at the same position refers to is shifted from the block border in the coding unit of the Base-View, it is possible to obtain the appropriate reference vector.

It should be noted that according to the first and second embodiments, the reference vector may point to a position out of the screen in some cases. In an image coding of MPEG-4 and subsequent systems, since a reference to a position out of the screen may also be carried out, in a case where the obtained motion vector points to the out-of-screen reference, the calculation is carried out while following the coding system.

For example, in a case of outreaching the upper side and/or the lower side of the screen, pixels where the uppermost pixels and/or the lowermost pixels on the screen of the same horizontal position are repeated are used. Also, in a case of outreaching the left side and/or the right side, pixels where the leftmost pixels and/or the rightmost pixels on the screen of the same vertical position are repeated are used.

In a case of the out-of-screen reference beyond the horizontal position and the vertical position of the screen, in other words, in a case of outreaching the upper left side, the lower left side, the upper right side, and the lower right side of the screen, pixels where the upper-leftmost pixels, the lower-leftmost pixels, the upper-rightmost pixels, the lower-rightmost pixels on the screen are repeated are used. By using the thus created block, the motion vector computation and the image coding computation are carried out.

A third embodiment will be described. Next, a video decoding device 300 according to the third embodiment will be described. According to the third embodiment, the decoding processing is carried out on the bit stream coded by the video coding device according to the first or second embodiment.

Figure 16:
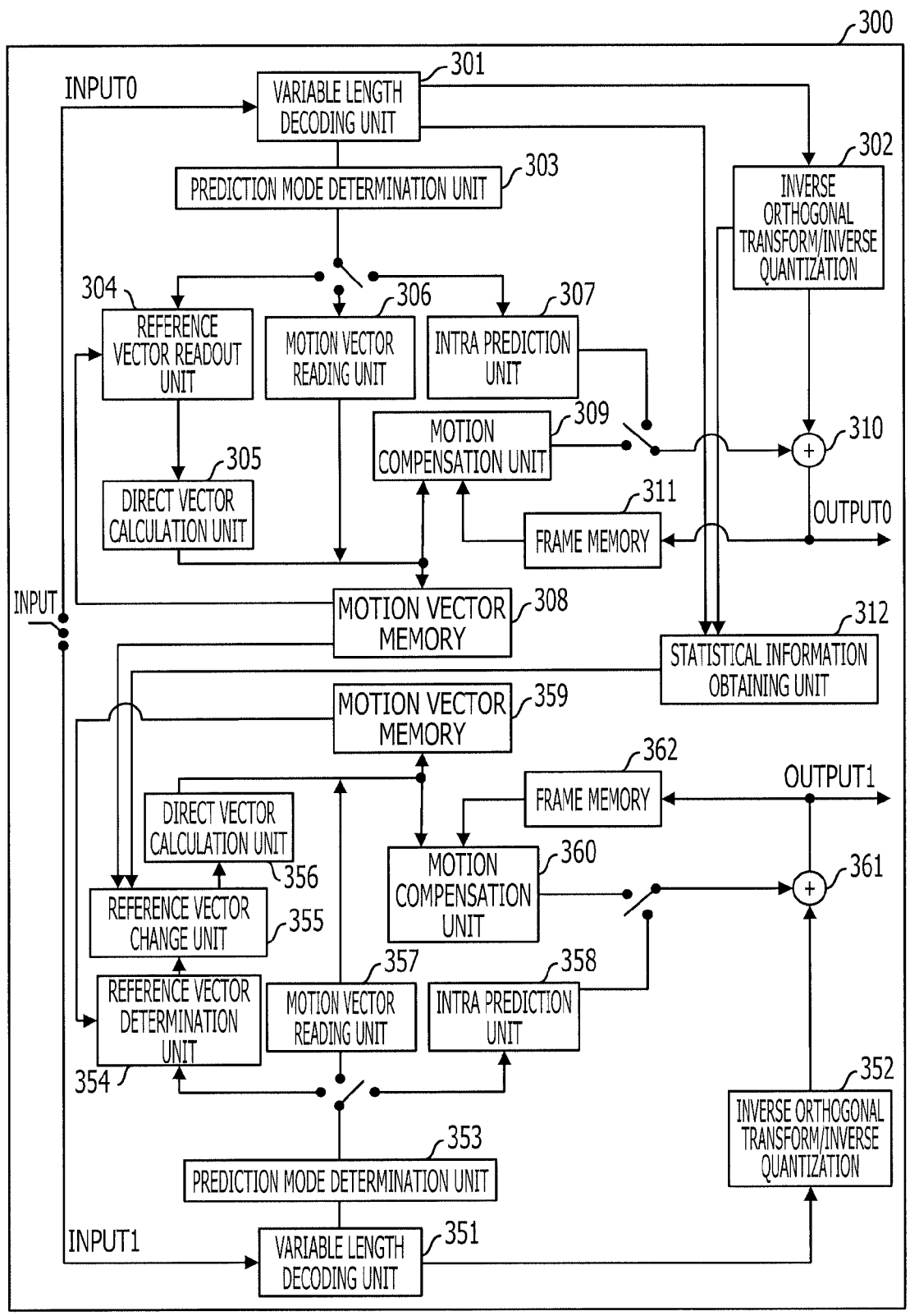
FIG. 16 is a block diagram illustrating an example of a configuration of a video decoding device according to a third embodiment.

FIG. 16 is a block diagram illustrating an example of a configuration of the video decoding device 300 according to the third embodiment. To decode the bit stream (input 0) of the Base-View, a video decoding device 300 illustrated in FIG. 16 is provided with a variable length decoding unit 301, an inverse orthogonal transform/inverse quantization 302, a prediction mode determination unit 303, a reference vector readout unit 304, and a direct vector calculation unit 305. Also, the video decoding device 300 is provided with a motion vector reading unit 306, an intra prediction unit 307, a motion vector memory 308, a motion compensation unit 309, a decoded image generation unit 310, and a frame memory 311.

Also, to decode the coded bit stream (input 1) of the non-Base-View, the video decoding device 300 is provided with a variable length decoding unit 351, an inverse orthogonal transform/inverse quantization 352, a prediction mode determination unit 353, a reference vector determination unit 354, and a reference vector change unit 355. Also, the video decoding device 300 is provided with a direct vector calculation unit 356, a motion vector reading unit 357, an intra prediction unit 358, a motion vector memory 359, a motion compensation unit 360, a decoded image generation unit 361, and a frame memory 362. For the decoding processing, a processing inverse to coding processing may basically be carried out.

The Base-View will be described. When the bit stream on the Base-View side is input, the variable length decoding unit 301 performs a variable length decoding corresponding to the variable length coding of the video coding device. The prediction error signal or the like decoded by the variable length decoding unit 301 is output to the inverse orthogonal transform/inverse quantization 302. The decoded data is various pieces of header information such as SPS (Sequence Parameter Set: sequence header) or PPS (Picture Parameter Set: picture header), data such as the prediction mode, the motion vector, or difference quotient information for each MB in the picture, or the like.

The inverse orthogonal transform/inverse quantization 302 performs an inverse quantization processing with respect to the output signal from the variable length decoding unit 301. The inverse orthogonal transform/inverse quantization 302 performs the inverse orthogonal transform processing with respect to the inversely quantized output signal to generate a residual signal. The residual signal is output to the decoded image generation unit 310.

The prediction mode determination unit 303 performs a reading determination to find out which prediction mode is used among the intra-frame coding, the forward prediction coding, the backward prediction coding, the bi-directive prediction coding, and the direct-mode for each MB. In actuality, the block division size and the like are included in this prediction mode.

When the prediction mode for the MB is decided, the decoding processing in accordance with the prediction mode is carried out. In the case of the intra-frame coding, the intra prediction unit 307 reads the mode of the intra prediction to perform the intra prediction.

In the case of the forward, backward, or bi-directive inter-frame prediction, the motion vector reading unit 306 reads the motion vector information from the decoded bit stream.

In the case of the direct-mode, the reference vector readout unit 304 reads out the motion vector mvCol from the motion vector memory 308 accumulated in the decoding processing for the decoded colPic.

The direct vector calculation unit 305 performs scaling on the mvCol and calculates the direct vector.

The motion compensation unit 309 performs a motion compensation on the basis of the direct vector calculated by the direct vector calculation unit 305 or the motion vector read by the motion vector reading unit 306 and the reference image obtained from the frame memory 311.

The decoded image generation unit 310 adds the prediction image output from the intra prediction unit 307 or the motion compensation unit 309 to the residual signal output from the inverse orthogonal transform/inverse quantization 302 to generate a decoded image. The generated decoded image is displayed on a display unit or output to the frame memory 311.

A statistical information obtaining unit 312 obtains statistical information at the time of the coding such as the qP value or the number of the differential effectiveness factors from the decoded bit stream for each MB. It should be noted that a case in which the statistical information is needed is only a case of the calculation method 3 for the reference vector according to the second embodiment.

The non-Base-View will be described. When the bit stream on the Base-View side is input, the variable length decoding unit 351 performs a variable length decoding corresponding to the variable length coding of the video coding device. The prediction error signal or the like decoded by the variable length decoding unit 351 is output to the inverse orthogonal transform/inverse quantization 352.

The inverse orthogonal transform/inverse quantization 352 performs an inverse quantization processing with respect to the output signal from the variable length decoding unit 351. The inverse orthogonal transform/inverse quantization 352 performs the inverse orthogonal transform processing with respect to the inversely quantized output signal to generate a residual signal. The residual signal is output to the decoded image generation unit 361.

The prediction mode determination unit 353 reads which prediction mode is used among the intra-frame coding, the forward prediction coding, the backward prediction coding, the bi-directive prediction coding, and the direct-mode for each MB. In actuality, the block division size and the like are included in this prediction mode.

When the prediction mode for the MB is decided, the decoding processing in accordance with the prediction mode is carried out. In the case of the intra-frame coding, the intra prediction unit 358 reads the mode of the intra prediction to perform the intra prediction.

In the case of the forward, backward, or bi-directive inter-frame prediction, the motion vector reading unit 357 reads the motion vector information from the decoded bit stream.

In the case of the direct-mode, a reference vector determination unit 354 reads out the motion vector mvCol from the motion vector memory 308 accumulated in the decoding processing for the decoded colPic. At this time, the reference vector determination unit 354 determines whether or not the motion vector mvCol is the inter-view reference (whether or not the motion vector mvCol is the disparity vector). This may be determined by the picture at the reference destination index. In a case where the picture at the reference destination index indicates a picture of another view point, this is the inter-view reference.

The reference vector determination unit 354 outputs the motion vector and the reference destination picture to a reference vector change unit 355 in the case of the inter-view reference and outputs the motion vector to the reference vector change unit 355 in the case of the same view point reference.

The reference vector change unit 355 performs the same processing as the contents processed by the coding device. For example, the reference vector change unit 355 sets the motion vector of the block overlapped with the iMB as the reference vector. Also, in a case where a plurality of blocks overlapped with the iMB exist, the reference vector change unit 355 obtains the motion vector of the block including the center position of the iMB and perform the weighting of the motion vector with the areas of the respective blocks. According to this configuration, the obtained motion vector becomes the reference vector.

In a case where the statistical information is used to calculate the reference vector at the time of the coding, the reference vector change unit 355 obtains the statistical information from the statistical information obtaining unit 312 and calculates the reference vector on the basis of the statistical information.

The direct vector calculation unit 356 performs scaling on the mvCol and calculates the direct vector.

The motion compensation unit 360 performs a motion compensation on the basis of the direct vector calculated by the direct vector calculation unit 356 or the motion vector read by the motion vector reading unit 357 and the reference image obtained from the frame memory 362.

The decoded image generation unit 361 adds the prediction image output from the intra prediction unit 358 or the motion compensation unit 360 to the residual signal output from the inverse orthogonal transform/inverse quantization 352 to generate a decoded image. The generated decoded image is displayed on a display unit or output to the frame memory 362.

According to this configuration, by carrying out the reference vector change processing similar to the video coding device according to the respective embodiments, it is possible to decode the bit stream generated through the coding.

Figure 17:
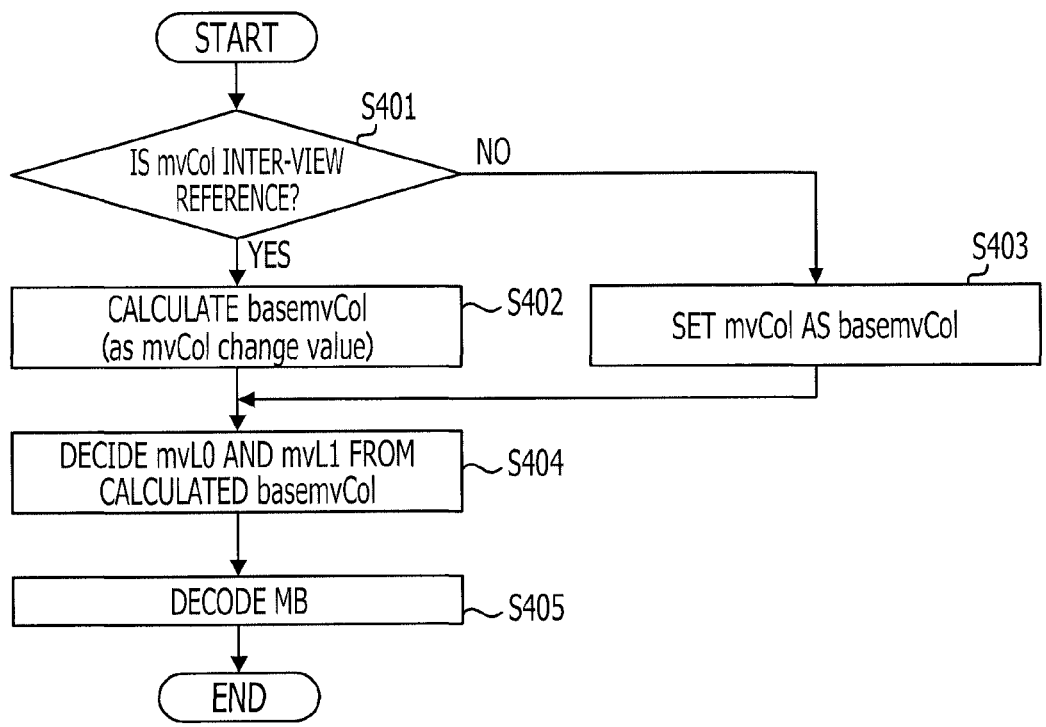
FIG. 17 is a flow chart illustrating an example of a decoding processing according to the third embodiment.

<Operation> Next, an operation of the video decoding device 300 according to the third embodiment will be described. FIG. 17 is a flow chart illustrating an example of a decoding processing according to the third embodiment. The processing illustrated in FIG. 17 indicates an example of a decoding processing when a block of a decoding target is coded in the direct-mode.

In operation S401 illustrated in FIG. 17, the reference vector determination unit 354 determines whether or not the vector belonging to the block at the same position of the picture (colPic) that becomes the reference of the temporal direct-mode with respect to the decoding target block is the disparity vector (whether or not the inter-view reference is carried out). In the case of the inter-view reference (operation S401—Yes), the flow progresses to operation S402, and in the case of the reference in the same view point (operation S401—No), the flow progresses to operation S403.

In operation S402, the reference vector change unit 355 calculates basemvCol on the basis of the motion vector of the block at the reference destination of the disparity vector belonging to the block at the same position. This calculation method is the same as the calculation method for the reference vector at the time of the coding.

In operation S403, the reference vector change unit 355 sets mvCol of the block at the same position as basemvCol.

In operation S404, the direct vector calculation unit 356 performs scaling with the temporal difference by using the reference vector and calculates the direct vectors mvL0 and mvL1.

In operation S405, the motion compensation unit 360, the decoded image generation unit 361, and the like perform the decoding processing on the decoding target MB.

According to this configuration, the decoding processing for 1 MB is ended. The decoding processings for other modes than the temporal direct-mode are similar to the decoding processings in related art.

As described above, according to the third embodiment, even when the temporal direct-mode is used for the inter-view prediction, by carrying out the reference vector change processing similar to the video coding device, it is possible to decode the bit stream generated by the video coding device according to the first or second embodiment.

A syntax will be described. Currently, the multi-view video coding of H.264 prescribes "in a case where the block indicating the inter-view prediction exists in the colPic, the direct-mode must be fixed to the spatial direct-mode". To elaborate, in this case, no definition of the temporal direct-mode is made.

According to the present embodiment, the reference vector in the temporal direct-mode is obtained through the calculation form the motion vector of another view point (the Base-View) in the case of the inter-view prediction, and the calculation for the temporal direct vector is carried out. Therefore, a syntax similar to that in related art may be used for the syntax according to the present embodiment.

Whether or not the mode is the temporal direct-mode is decided by "direct_spatial_mv_pred_flag" existing in Slice Header. FIG. 18 illustrates an example of the Slice Header. If "direct_spatial_mv_pred_flag" illustrated in FIG. 18 is 0, the temporal direct-mode is indicated, and if "direct_spatial_mv_pred_flag" is 1, the spatial direct-mode is indicated.

The motion vector in the direct-mode which is derived from the calculation, the mvCol, the basemvCol, the mvL0, the mvL1, and the like are not included in the coding syntax. Therefore, the coding syntax may be applied to the present embodiment as it is as in related art.

Figure 19:
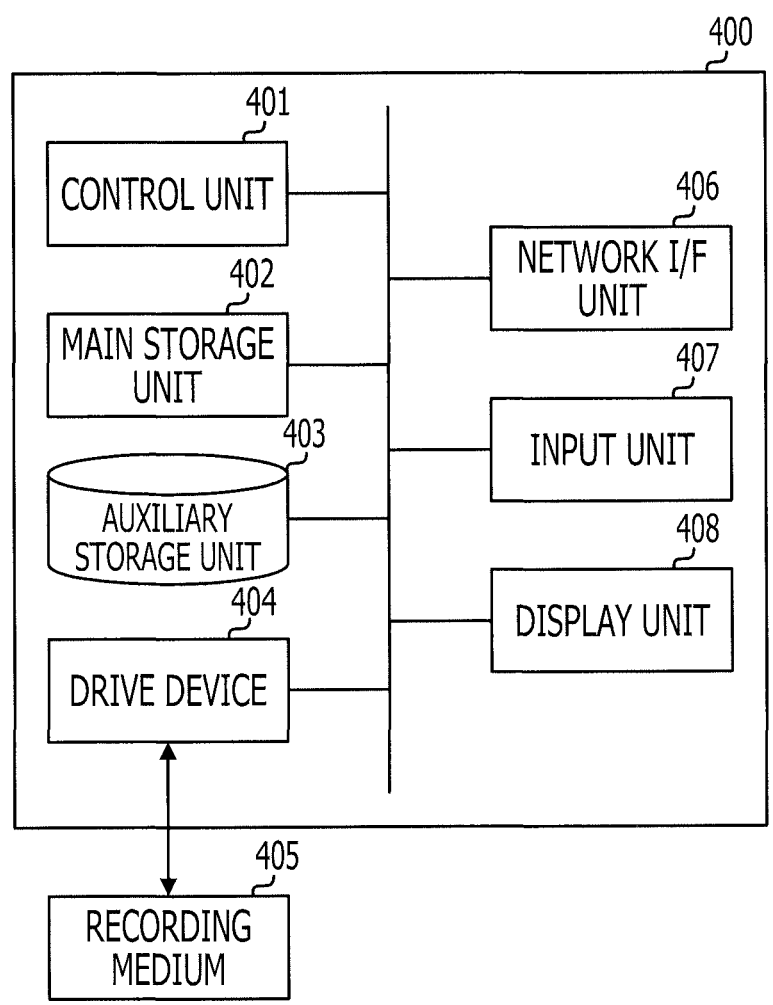
FIG. 19 illustrates an example of a configuration of an image processing device.

A fourth embodiment will be described. FIG. 19 illustrates an example of a configuration of an image processing device 400. The image processing device 400 is an example of the video coding device or the video decoding device described according to the embodiment. As illustrated in FIG. 19, the image processing device 400 includes a control unit 401, a main storage unit 402, an auxiliary storage unit 403, a drive device 404, a network I/F unit 406, an input unit 407, and a display unit 408. These respective configurations are mutually connected via a bus so as to be able to transmit and receive data.

The control unit 401 is a CPU configured to perform a control on the respective devices and a computation or a process of data in a computer. Also, the control unit 401 is a computation device configured to execute a program stored in the main storage unit 402 or the auxiliary storage unit 403 and receive data from the input unit 407 and the storage device, compute, process, and then output the resultant to the display unit 408, the storage device, and the like.

The main storage unit 402 is a ROM (Read Only Memory), a RAM (Random Access Memory), or the like and is a storage device configured to store or temporarily save a program or data such as an OS that is basic software or application software executed by the control unit 401.

The auxiliary storage unit 403 is an HDD (Hard Disk Drive) or the like is a storage device configured to store data related to the application software.

The drive device 404 reads out a program from a recording medium 405 such as, for example, a flexible disc to be installed into the storage device.

Also, the recording medium 405 stores a predetermined program, and this program stored in the recording medium 405 is installed via the drive device 404 into the image processing device 400. The installed predetermined program may be executed by the image processing device 400.

The network I/F unit 406 is an interface between a peripheral device having a communication function which is connected via a network such as a LAN (Local Area Network) or a WAN (Wide Area Network) constructed by data transmission paths such as a wired and/or wireless circuit and the image processing device 400.

The input unit 407 has a key board provided with a cursor key, numeral input and various function keys, and the like, a mouse or a slice pad for performing a selection or the like of a key on a display screen of the display unit 408, and the like. Also, the input unit 407 is a user interface for the user to issue an operation instruction to the control unit 401 or input data.

The display unit 408 is composed of a CRT (Cathode Ray Tube), an LCD (Liquid Crystal Display), or the like, where a display in accordance with display data that is input from the control unit 401 is carried out.

In this manner, the video coding processing or the video decoding processing described according to the above-mentioned embodiments may also be realized as a program executed by a computer. While this program is installed from a server or the like and the computer is caused to execute the program, the image coding processing or the image decoding processing described above may be realized.

Also, the image coding processing or the image decoding processing described above may be realized in such a manner that this program is recorded on the recording medium 405 and the computer or a mobile terminal is caused to read the recording medium 405 on which this program is recorded. It should be noted that for the recording medium 405, various types of recording media may be used such as a recording medium, a ROM, and the like on which information is optically, electrically, or magnetically recorded like a CD-ROM, a flexible disc, an opto-magnetic disc, and the like ROM, and a semiconductor memory on which information is electrically recorded like a flash memory. Also, the image coding processing or the image decoding processing described according to the above-mentioned respective embodiments may be mounted to one or a plurality of integrated circuits.

According to the embodiments, the coding method and the decoding method corresponding to the stereoscopic view that is the stereoscopic vision of two view points has been described, but even in the case of a multi-view vision having three or more view points, the concept is basically the same. Therefore, even in a case where the inter-view reference prediction is carried out in the picture where the inter-view reference is carried out, the reference vector in the temporal direct-mode of the relevant block is generated from the motion vector in the picture at the reference destination. According to this configuration, even in the case of the inter-view prediction, the temporal direct-mode may be used. In a case also where the block at the destination of the inter-view reference further performs the inter-view reference, the reference vector in the temporal direct-mode may be generated in a similar concept.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A video decoding method of decoding coded data of a multi-view video, the method comprising:
   determining whether a block, at a same position of a picture that becomes a reference of a temporal direct-mode with respect to a decoding target block, has a disparity vector referring to a block of another view point;
   calculating, using a processor, when determining the block at the same position has the disparity vector, a motion vector of the decoding target block by using a motion vector belonging to the block of the another view point to which the disparity vector refers, wherein when the motion vector is calculated, when the block of another view point to which the disparity vector refers includes a plurality of blocks, a predetermined motion vector based on motion vectors belonging to the plurality of blocks is used;
   decoding the decoding target block by using the calculated motion vector; and
   obtaining statistical information including a quantization scale used when the respective blocks of the plurality of blocks are coded and a magnitude and the number of difference quotients,
   wherein the predetermined motion vector is a motion vector obtained by carrying out weighted averaging with respect to respective motion vectors of the plurality of blocks in accordance with confidence coefficients of the respective blocks determined by using the statistical information on the respective blocks.

2. The method according to claim 1,
wherein the predetermined motion vector is a motion vector of a block including a center position of the block of another view point.

3. The method according to claim 1,
wherein the predetermined motion vector is a motion vector obtained by carrying out weighted averaging with respect to respective motion vectors of the plurality of blocks in accordance with sizes of regions of the plurality of blocks included in the block of another view point.

4. The method according to claim 1,
wherein the calculating calculates the motion vector of the decoding target block by using the motion vector belonging to the block of the another view point to which the disparity vector refers as a reference vector and scaling the reference vector at a time allocation, when determining the block at the same position has the disparity vector.

5. A video coding method of performing a coding of a multi-view video, the method comprising:
using, in a case where a coding target block is coded in a temporal direct-mode when determining that a block at a same position of a picture that becomes a reference of the temporal direct-mode with respect to the coding target block has a disparity vector referring to a block of another view point, a motion vector belonging to the block of the another view point to which the disparity vector refers;
calculating, using a processor, the motion vector of the coding target block, wherein when the motion vector is calculated, when the block of another view point to which the disparity vector refers includes a plurality of blocks, a predetermined motion vector based on motion vectors belonging to the plurality of blocks is used;
coding the coding target block by using the calculated motion vector; and
obtaining statistical information including a quantization scale used when the respective blocks of the plurality of blocks are coded and a magnitude and the number of difference quotients,
wherein the predetermined motion vector is a motion vector obtained by carrying out weighted averaging with respect to respective motion vectors of the plurality of blocks in accordance with confidence coefficients of the respective blocks determined by using the statistical information on the respective blocks.

6. A video decoding device to decode coded data of a multi-view video, the device comprising:
a processor; and
a memory which stores a plurality of instructions, which when executed by the processor, cause the processor to perform
determining, when a decoding target block is coded in a temporal direct-mode, whether a block, at a same position of a picture that becomes a reference of the temporal direct-mode with respect to the decoding target block, has a disparity vector referring to a block of another view point;
calculating, when determining the block at the same position has the disparity vector, a motion vector belonging to the block of the another view point to which the disparity vector refers and calculating a motion vector of the decoding target block, wherein when the block of another view point to which the disparity vector refers includes a plurality of blocks, the calculating uses a predetermined motion vector based on motion vectors belonging to the plurality of blocks;
decoding the decoding target block by using the calculated motion vector; and
obtaining statistical information including a quantization scale used when the respective blocks of the plurality of blocks are coded and a magnitude and the number of difference quotients,
wherein the predetermined motion vector is a motion vector obtained by carrying out weighted averaging with respect to respective motion vectors of the plurality of blocks in accordance with confidence coefficients of the respective blocks determined by using the statistical information on the respective blocks.

7. The device according to claim 6,
wherein the predetermined motion vector is a motion vector of a block including a center position of the block of another view point.

8. The device according to claim 6,
wherein the predetermined motion vector is a motion vector obtained by carrying out weighted averaging with respect to respective motion vectors of the plurality of blocks in accordance with sizes of regions of the plurality of blocks included in the block of another view point.

* * * * *